United States Patent
Ogata et al.

[11] Patent Number: 5,955,049
[45] Date of Patent: Sep. 21, 1999

[54] MESOPORE MATERIAL AND METHOD FOR PRODUCING THE SAME

[75] Inventors: Shin-ichi Ogata; Yoshiaki Fukushima, both of Aichi-ken, Japan

[73] Assignee: Kabushiki Kaisha Toyota Chuo Kenkyusho, Aichi-ken, Japan

[21] Appl. No.: 09/050,803

[22] Filed: Mar. 31, 1998

[30] Foreign Application Priority Data

Mar. 31, 1997 [JP] Japan ................................. 9-098463
Mar. 30, 1998 [JP] Japan ................................ 10-103724

[51] Int. Cl.⁶ ........................... C01B 33/38; C01B 33/44
[52] U.S. Cl. .................. 423/326; 423/328.1; 423/328.2; 423/331; 423/332; 423/335; 502/60; 502/80; 502/82; 502/83
[58] Field of Search ................................. 423/326, 328.1, 423/328.2, 331, 332, 335; 502/60, 80, 81, 82, 83

[56] References Cited

U.S. PATENT DOCUMENTS

| | | | |
|---|---|---|---|
| 1,884,709 | 10/1932 | Jenkins et al. | 423/335 |
| 2,947,054 | 3/1960 | Beamesderfer et al. | 423/335 |
| 3,617,215 | 11/1971 | Sugahara et al. | 423/335 |
| 4,968,652 | 11/1990 | Johnson et al. | 423/328.2 |
| 5,068,216 | 11/1991 | Johnson et al. | 423/331 |
| 5,310,715 | 5/1994 | Kresge et al. | 423/328.2 |
| 5,382,588 | 1/1995 | Inagaki et al. | 502/407 |
| 5,508,081 | 4/1996 | Inagaki et al. | 502/60 |
| 5,599,759 | 2/1997 | Inagaki et al. | |
| 5,750,085 | 5/1998 | Yamada et al. | 423/326 |

FOREIGN PATENT DOCUMENTS 0 397 216 A1  11/1990  European Pat. Off. .
9-194298  7/1997  Japan .

OTHER PUBLICATIONS

I.A. Aksay, et al., "Biomimetic Pathways for Assembling Inorganic Thin Films", Science, vol. 273, Aug. 16, 1996, pp. 892–898.

Kiyoshi Okada, et al., "New Preparation Method for Mesoporous γ–Alumina by Selective Leaching Of Calcined Kaolin Minerals", J. Mater. Chem., 1995, vol. 5, No. 8. pp. 1241–1244 (No Month).

*Primary Examiner*—Mark L. Bell
*Assistant Examiner*—David Sample
*Attorney, Agent, or Firm*—Oblon, Spivak, McClelland, Maier & Neustadt, P.C.

[57] ABSTRACT

A silicon dioxide tetrahedron sheet having a specific morphology with the pseudomorphs of the starting raw material of clay minerals for the sheet is prepared, and this is reacted with an alkylonium salt whereby a desired number of the silicon dioxide tetrahedrons are removed from the sheet by the action of the micelles of the alkylonium salt formed on the surface of the sheet to thereby form mesopores in the sheet. The mesopore material of the sheet has phyllo-structured 6-membered skeletons as connected to each other, in which each one phyllo-structured 6-membered skeleton is formed by connecting 6 silicon dioxide tetrahedrons together, and its mesopores are formed by removing a desired number of the silicon dioxide tetrahedrons from the sheet.

17 Claims, 35 Drawing Sheets

- Si   ○ O   ⊕ H2Ocryst.
- Mg   ⊙ OH  ⊘ H2Ozeol.

200 nm 200 nm

100nm 100 nm

100nm 100 nm

100nm 50 nm

50nm

MESOPORE MATERIAL AND METHOD FOR PRODUCING THE SAME

BACKGROUND OF THE INVENTION

1. Field of the Invention

The present invention relates to a mesopore material and a method for producing it. The invention provides a material of a new category in that the material is of a silicon dioxide tetrahedron sheet having mesopores which are oriented vertical to the surface of the sheet and have a pore size falling between 1 and 50 nm, and in that the silicon dioxide tetrahedron sheet has a specific two-dimensional or three-dimensional structure of the original pseudomorphs of its raw material of clay minerals.

2. Description of the Related Art

Zeolite is known as an inorganic porous material capable of being used as catalysts, adsorbents and the like.

The present applicant has already proposed excellent, novel porous materials to be within the category of so-called mesopore materials, which are produced from phyllo-structured clay minerals, for example, in Japanese Patent Application Laid-Open No. Hei-4-238810 and Japanese Patent Application No. Hei-8-261472.

However, as their pores are all in the form of deep tunnels, the known material, zeolite, and the mesopore materials which the applicant has proposed have problems in some uses in that their pores are often clogged with metal grains held on them with the result that their large surface area could not be utilized effectively, and in that the direction of the pores of each particles could vary depending on particles. In addition, as having such deep pores, the known porous or mesopore materials would be unfavorable to the uses where not so deep pores are desired.

The mesopore materials noted above have a honeycomb-like porous structure while having lost the intrinsic pseudomorphs (e.g., tabular, tubular or fibrous pseudomorphs) of their raw material of clay minerals during their production. However, if they still keep the intrinsic pseudomorphs of their raw material of clay minerals as such, their novel applications could be developed.

SUMMARY OF THE INVENTION

To solve the problems in the related art, the first aspect of the invention is to provide a mesopore material comprising a silicon dioxide tetrahedron sheet having phyllo-structured 6-membered skeletons as connected to each other, each one phyllo-structured 6-membered skeleton being formed by connecting 6 silicon dioxide tetrahedrons together, and the sheet having pores therein as formed by removing a desired number of the silicon dioxide tetrahedrons from the sheet.

Also to solve the problems in the related art, the second aspect of the invention is to provide a method for producing a mesopore material of a silicon dioxide tetrahedron sheet, which comprises a step of reacting a silicon dioxide tetrahedron sheet with an alkylonium salt, the sheet being formed by connecting phyllo-structured 6-membered skeletons each other, each one phyllo-structured 6-membered skeleton being formed by connecting 6 silicon dioxide tetrahedrons together, thereby removing a desired number of the silicon dioxide tetrahedrons to form pores in the sheet.

In the mesopore material of the first aspect of the invention, the pores are formed in the silicon dioxide tetrahedron sheet itself while being vertical to the surface of the sheet. Accordingly, in this, the depth of each pore is nearly the same as the thickness of the sheet, or is about 0.5 nm or so. Where a plurality of those sheets are laminated, the depth of each pore in the resulting laminate may be nearly the same as the thickness of the laminate but is smaller than about 50 nm or so.

Where the mesopore material of the invention is used as a catalyst carrier for exhaust gas converter or the like, the size of the catalytic component of metal grains to be held on the carrier may be controlled by the pore size, like that to be on conventional mesopore material carriers, but, being different from those in conventional ones, the pores in the mesopore material carrier of the invention are not clogged with the metal grains as their depth is small. Accordingly, using the mesopore material carrier of the invention, the contact efficiency between the fine metal grains held on the carrier and exhaust gas is increased, resulting in that the degree of exhaust gas conversion is much increased. Thus, the mesopore material of the invention is expected to be excellent results which any other conventional ones could not.

Another advantage of the mesopore material of the invention when used as a catalyst carrier is that, since fine catalytic metal grains, of which the size is controlled by the size of the pores in the material, exist in the vicinity of the surface of the silicon dioxide tetrahedron sheet of the material, the metal grains can react with substances having a larger size than the size of the pores.

In addition, as having such specific pores, the mesopore material of the invention is favorably used in an adsorbent. The adsorbent comprising the mesopore material of the invention can be contacted with a large number of substances to be adsorbed by it all at a time, since the mesopore material has a large number of pore openings per the unit weight thereof. Accordingly, the adsorbent comprising the mesopore material of the invention is expected to have the advantage of great adsorbability.

The silicon dioxide tetrahedron sheet itself of the mesopore material of the invention may be in any of tabular, tubular, fibrous forms or the like, for example, as in FIG. 1(A) to FIG. 1(C), in which many pores 2 exist on the surface of such a specifically-formed silicon dioxide tetrahedron sheet 1.

Of the porous materials as formed to have such specific forms, a thin film is formed by casting an aqueous dispersion of the tabular mesopore material illustrated in FIG. 1(A), in which the pores can be oriented vertical to the surface of the thin film. Therefore, the thin film of this type can be used as a separation membrane. On the other hand, the tubular or fibrous mesopore material as in FIG. 1(B) and FIG. 1(C), respectively, can be combined with a thermoplastic polymer to give a composite material, which can be used as an adsorbent.

In view of the points noted above, the mesopore material of the first aspect of the invention has many applications in various technical fields of catalysts, adsorbents and separators, in which it may be used as a catalyst carrier, an adsorbent medium, a separating membrane, etc.

The present applicant discloses in Japanese Patent Application No. Hei-8-261472, which is not as yet laid open, that a method for producing a mesopore material comprises reacting a clay mineral with an acid to give a phyllo-silicic acid, then reacting the resulting phyllo-silicic acid with an alkali metal compound to give a phyllo-silicate, then further reacting the resulting phyllo-silicate with a surfactant to give a condensate having a three-dimensional silicate structure and containing the surfactant therein, and thereafter removing the surfactant from the condensate.

According to the disclosed method, phyllo-silicic acid is converted into a phyllo-silicate and then reacted with a surfactant (alkylammonium salt). Therefore, in this method, a honeycomb-shaped, three-dimensional silicate structure containing the surfactant therein is formed while, at the same time, the phyllo-silicic acid is hydrolyzed with an alkali in the side reaction whereby the final product, mesopore material shall lose the pseudomorphs of the starting material of clay minerals.

As opposed to this, in the second aspect of the invention, phyllo-silicic acid (in the form of a silicon dioxide tetrahedron sheet) is directly reacted with an alkylonium salt without being converted into a phyllo-silicate. Under this reaction condition, the starting phyllo-silicic acid is not almost hydrolyzed with an alkali, and the alkylonium salt directly adheres to the surface of the phyllo-silicic acid sheet while still having its counter ion therewith.

As a result, any honeycomb-shaped, three-dimensional silicate structure is not formed in the process but silicon dioxide tetrahedrons drop off from the silicon dioxide tetrahedron sheet. This is the first characteristic feature of the invention.

In this process, the alkylonium salt forms spherical or columnar micelles on the surface of the silicon dioxide tetrahedron sheet, while its counter anion reacts on phyllo-silicic acid, whereby formed are pores resulting from the dropping of silicon dioxide tetrahedrons and having a size corresponding to the diameter of the micelles, in the silicon dioxide tetrahedron sheet. These are the pores in the mesopore material of the invention.

The diameter of the micelles and the uniformity in the diameter of each micelle can be freely controlled within the range of about 1 nm or more by selecting the length of the alkyl chain constituting the alkylonium salt to be used. Accordingly, the pores and their uniformity in the mesopore material of the invention can be freely determined within the range of about 1 nm or more.

Where the starting material of clay minerals used has a specific structure of, for example, tabular, tubular or fibrous forms, the mesopore material of the invention does not still lose the pseudomorphs of the clay minerals, resulting in that it has the specific morphological structure as defined herein. This is the second characteristic feature of the invention.

DESCRIPTION OF PREFERRED EMBODIMENTS OF THE INVENTION

Now, the invention is described in detail herein under.

Production of Mesopore Material
Raw Material of Clay Minerals:

The raw material of clay minerals for use in the invention may be any of natural or synthetic ones comprising silicon dioxide tetrahedron layers each having a silicon dioxide-based, phyllo-structured, 6-membered skeleton. Any of phyllo-structured clay minerals or non-phyllo-structured clay minerals are employable herein. Such clay minerals may include, for example, the following <1> to <3>.

<1> Phyllo-structured clay minerals having a 1:1 layered structure of silicon dioxide tetrahedron layers and octahedron layers of any other metals, such as kaolinite, dickite, nacrite, hallosyte and the like having octahedron layers of Al, and crysotile, lizardite and the like having octahedron layers of Mg.

<2> Phyllo-structured clay minerals having a 2:1 layered structure of silicon dioxide tetrahedron layers and octahedron layers of any other metals, such as pyrophyllite, muscovite, montmorillonite, beidellite, bi-octahedron vermiculite and the like having octahedron layers of Al, talc, phlogopite, saponite, hectorite, Mg-vermiculite and the like having octahedron layers of Mg, tri-octahedron vermiculite, nontronite and the like having octahedron layers of Fe.

<3> Non-phyllo-structured clay minerals, such as sepiolite, palygorskite and the like having a 2:1 layered structure of silicon dioxide tetrahedron layers and octahedron layers of Mg, and antigorite ant the like having a 1:1 layered structure of silicon dioxide tetrahedron layers and octahedron layers of Mg.

Figure 2A:
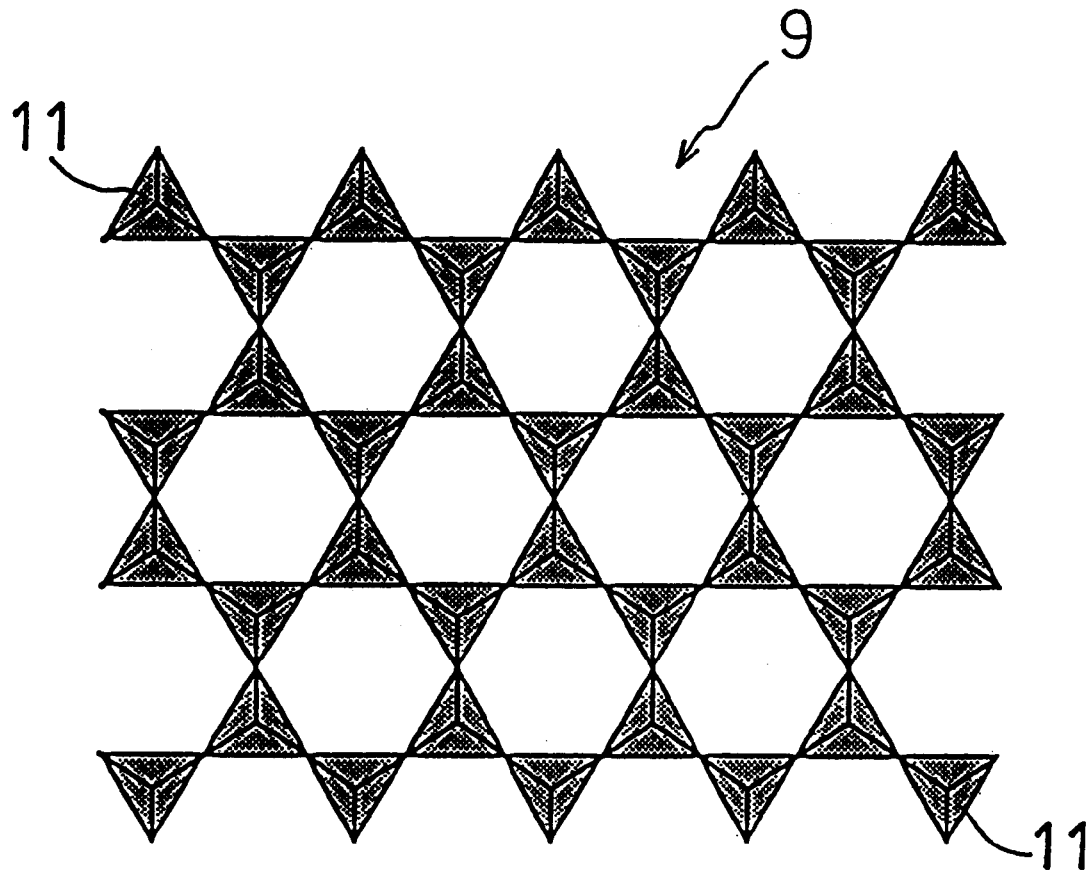
FIG. 2(A) is a plan view of a silicon dioxide tetrahedron sheet having a non-inverted structure.
Figure 2B:
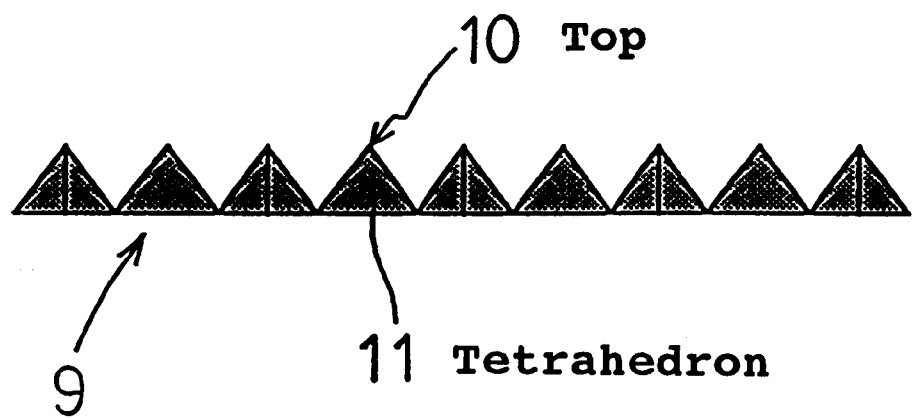
FIG. 2(B) is a side view of a silicon dioxide tetrahedron sheet having a non-inverted structure.
Figure 3A:
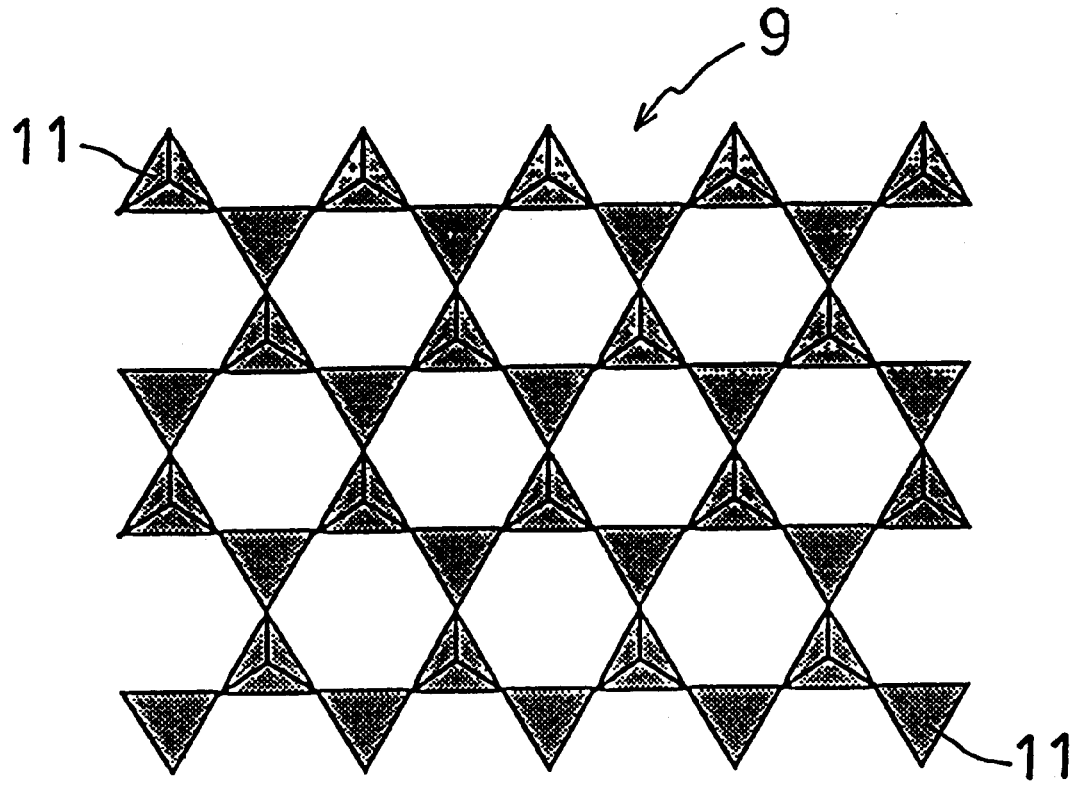
FIG. 3(A) is a plan view of a silicon dioxide tetrahedron sheet having an alternately-inverted structure.
Figure 3B:
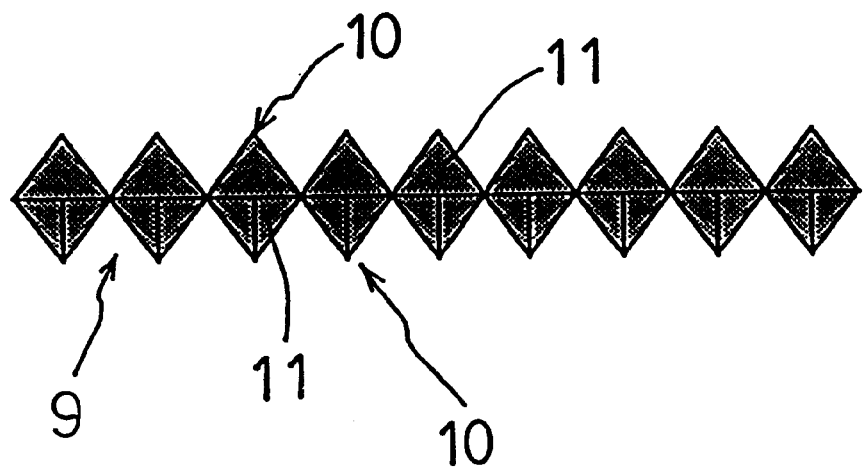
FIG. 3(B) is a side view of a silicon dioxide tetrahedron sheet having an alternately-inverted structure.

Clay minerals of the types <1> and <2> noted above have $SiO_4$ tetrahedron layers of a so-called, non-inverted structure, as in FIG. 2(A) and FIG. 2(B), in which the top 10 of each $SiO_4$ tetrahedron 11 in the $SiO_4$ tetrahedron layer 9 is oriented in one and the same direction; while those of the type <3> have $SiO_4$ tetrahedron layers of a so-called, inverted structure, as in FIG. 3(A) and FIG. 3(B), in which the top 10 of each $SiO_4$ tetrahedron 11 in the $SiO_4$ tetrahedron layer 9 is not oriented in one and the same direction, but the tops of some $SiO_4$ tetrahedrons 11 face in one direction with those of the other $SiO_4$ tetrahedrons 11 facing in the opposite direction. FIG. 3(A) and FIG. 3(B) illustrate one embodiment of an alternately-inverted structure of a silicon dioxide tetrahedron sheet, but the clay minerals of the type <3> is not limited to only the illustrated one, but may have a block-inverted structure in which a plurality of blocks each composed of a few $SiO_4$ tetrahedrons are oriented in opposite directions with the top of each $SiO_4$ tetrahedron in one block facing oppositely to that in the adjacent blocks.

Figure 1A:
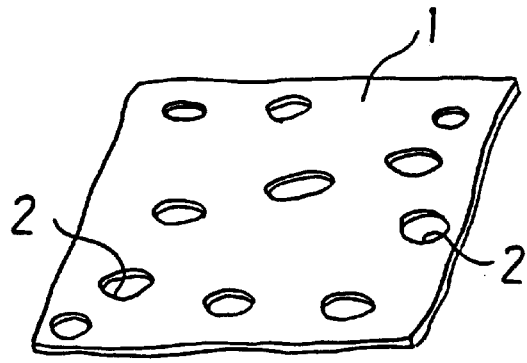
FIG. 1(A) to FIG. 1(C) each are a perspective view of the mesopore material of the invention having a specific two-dimensional or three-dimensional structure.
Figure 1B:
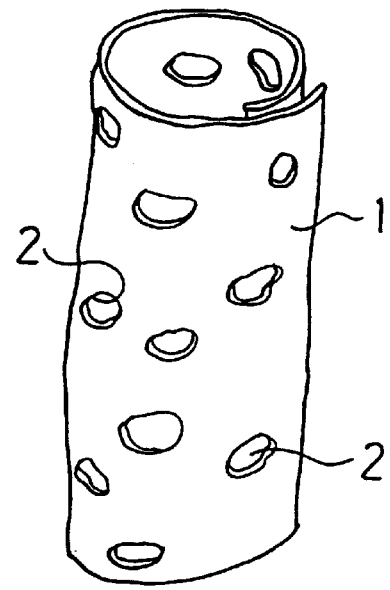
Figure 1C:
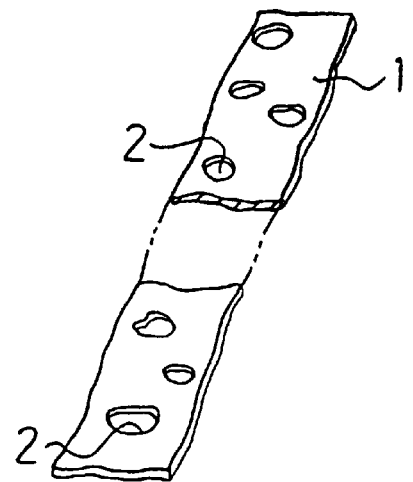

The raw material of clay minerals for use in the invention has a specific structure. For example, vermiculite, kaolinite, hectorite, montmorillonite and the like are tabular, crysotile and the like are tubular, and sepiolite and the like are fibrous. The silicon dioxide tetrahedron sheets to be obtained from those clay minerals all keep the pseudomorphs of the starting clay minerals to be in any form of FIG. 1(A) to FIG. 1(C).

The size of the raw material of clay minerals used shall define the size of the silicon dioxide tetrahedron sheets to be prepared therefrom. As requested, therefore, silicon dioxide tetrahedron sheets of different sizes can be prepared, ranging from small-sized, silicon dioxide tetrahedron sheets of 100 nm or so in size to be prepared from clay minerals such as hectorite, to large-sized, silicon dioxide tetrahedron sheets of 20 cm or so in size to be prepared from clay minerals such as muscovite.

Preparation of Silicon Dioxide Tetrahedron Sheet:

The silicon dioxide tetrahedron sheet having phyllo-structured 6-membered skeletons as connected to each other can be obtained by treating the raw material of clay minerals with an acid to thereby dissolve the metal constituting the metal oxide octahedron layers in the material (that is, to disintegrate the octahedron layer structure of the metal oxide in the material).

As the acid to be used in this treatment, preferred is one capable of giving salts, such as aluminium salts, iron salts or magnesium salts, having a high solubility in water in order that those salts as formed as a result of the acid treatment may be removed in the subsequent post-treatment with water.

Usable is any of aqueous solutions of hydrochloric acid, sulfuric acid, nitric acid, phosphoric acid or the like and their mixtures.

The concentration of the acid solution to be used is not specifically defined. Preferred are acid solutions of 3 N (normality) or more, as the reaction speed with them is high. Regarding the amount of the acid to be used in the acid treatment, preferably used is an aqueous solution of an acid having an acid content of 2 mols or more for 100 g of clay minerals to be processed therewith.

The acid treatment may be effected under any condition of normal pressure or increased pressure. For the acid treatment under normal pressure, it is preferable that the starting clay minerals are dipped in an aqueous solution of an acid, and stirred with heating in a reactor equipped with a condenser. For the acid treatment under increased pressure, it is preferable that the starting clay minerals are dipped in an aqueous solution of an acid, and stirred with heating under increased pressure.

After having been treated with an acid, preferably, the reaction mixture is fully washed with 1 N hydrochloric acid and with water, and then freeze-dried to obtain the intended phyllo-silicic acid (silicon dioxide tetrahedron sheet).

Also employable herein are synthetic or natural phyllo-silicates, which include, for example, clay mineral (sepiolite, vermiculite, palygorskite, crysotile, serpentine, chlorite, smectite, mica, kaolinite, halloysite, and so on), layered polysilicate (kanemite, ilerite, magadiite, kenyaite, disodium silicate crystals, and so on). Phyllo-silicates, in detail, are kanemite ($NaHSi_2O_5.3H_2O$), disodium silicate crystals ($\alpha,\beta,\gamma,\delta\text{-}Na_2Si_2O_5$), makatite ($Na_2Si_4O_9.5H_2O$), ilerite ($Na_2Si_8O_{17}.xH_2O$), magadiite ($Na_2Si_{14}O_{29}.xH_2O$), kenyaite ($Na_2Si_{20}O_{41}.xH_2O$), etc. These may be treated, for example, in the following manner to obtain silicon dioxide tetrahedron sheets.

The synthetic or natural phyllo-silicate is dispersed in 1 N hydrochloric acid with stirring, then filtered, and washed with water. The resulting residue gives, after having been freeze-dried, the intended phyllo-silicic acid (silicon dioxide tetrahedron sheet).

Alkylonium Salt:

The silicon dioxide tetrahedron sheet as obtained as a result of the treatment mentioned above is then reacted with an alkylonium salt. Basically, the alkylonium salt to be used herein is not specifically defined.

However, preferred are alkylonium salts, of which the counter anion moiety is a conjugate base of a weak acid, for the intended partial alkyl-hydrolysis of the silicon dioxide tetrahedron sheet. Of such alkylonium salts of which the counter anion moiety is a conjugate base of a weak acid, more preferred are alkylonium hydroxides.

Also preferably used herein are alkylonium fluorides, of which the counter anion moiety is anions of fluoride compounds (F, $BF_4$, $PF_6$, $AsF_6$, etc.), for the intended partial alkyl-hydrolysis of the silicon dioxide tetrahedron sheet. Of those having a fluoride ion as the counter anion moiety, more preferred are alkylonium fluorides.

Apart from alkylonium fluorides having a fluoride ion as the counter anion moiety, further employable herein are alkylonium halides having a halide ion except fluoride as the counter anion moiety. If used herein, however, these must be mixed with alkali hydroxides to form alkylonium hydroxides in the reaction system, prior to being reacted with silicon dioxide tetrahedron sheets.

As the alkylonium moiety, more preferred is any of alkylammoniums, alkylsulfoniums, and alkylphosphoniums. As the alkyl moiety of the alkylonium salts, preferred is a combination of short, linear or branched alkyl groups each having 4 or less carbon atoms, and long, linear or branched alkyl groups each having 5 or more carbon atoms. More preferred are alkylonium salts of which the long alkyl groups are long n-alkyl groups having from 5 to 30 carbon atoms. The alkyl moiety of the alkylonium salts may be substituted with any of aromatic rings, heterocyclic rings and saturated aliphatic rings, and may comprise halogenoalkyl groups.

In view of the above, at least at present, one best example of the alkylonium salts for use in the invention is a mono-long n-alkyl-trimethylammonium hydroxide of which the alkyl moiety is composed of three methyl groups and one long n-alkyl group.

The diameter of each alkylonium micelle that fills the role of forming pores in silicon dioxide tetrahedron sheets processed with an alkylonium salt depends on the length of the long alkyl group (that is, the number of carbon atoms constituting the group) in the alkylonium salt. Therefore, the mono-long n-alkyl-trimethylammonium hydroxide noted above has the advantage of easily forming uniform alkylonium micelles having the same form and the same size, thereby forming more uniform pores in the sheets processed therewith.

Reaction Between Alkylonium Salt and Silicon Dioxide Tetrahedron Sheet:

First, an alkylonium salt and a silicon dioxide tetrahedron sheet to be processed therewith are mixed in water. In this, the two may be dispersed in water all at a time, or, alternatively, the two are separately dispersed in water and the resulting two aqueous dispersion may be mixed. In case of the use of alkylonium halides having a halide ion except fluoride, such as alkylonium chlorides, the alkylonium halide is dispersed in water along with one equivalent of an alkali hydroxide, and the resulting aqueous dispersion is mixed with a silicon dioxide tetrahedron sheet or its aqueous dispersion.

Next, the resulting mixture is heated at a temperature falling between room temperature and 300° C., under normal pressure or increased pressure for 1 hour to 10 days or so, with or without stirring, whereby the sheet is reacted with the alkylonium salt.

Next, the solid component is taken out from the reaction mixture through filtration, washed with water, dried, and then calcined at a temperature falling between 300° C. and 800° C. for 1 hour or longer, or washed with an alcohol, such as methanol or ethanol containing an acid. As a result of this process, obtained is a mesopore material of the invention.

Mesopore Material

Silicon Dioxide Tetrahedron Sheet:

The silicon dioxide tetrahedron sheet having phyllo-structured 6-membered skeletons of silicon dioxide as connected to each other, which is processed in the invention, has a sheet structure of silicon dioxide tetrahedron layers intrinsic to the starting material of clay minerals noted above, or that is, this has any of the sheet structure of FIG. 2(A) and FIG. 2(B) (non-inverted structure), that of FIG. 3(A) and FIG. 3(B) (inverted structure), or the block-inverted structure noted above, in which silicon dioxide tetrahedrons are two-dimensionally connected to each other, but in which the direction of the top of each silicon dioxide tetrahedron is not specifically defined. Therefore, the alternately-inverted structure illustrated in FIG. 3(A) and FIG. 3(B) will be typically referred to hereinunder for the sheet structure of the silicon dioxide tetrahedron sheet having phyllo-structured 6-membered skeletons of silicon dioxide as connected to each other.

Figure 4:
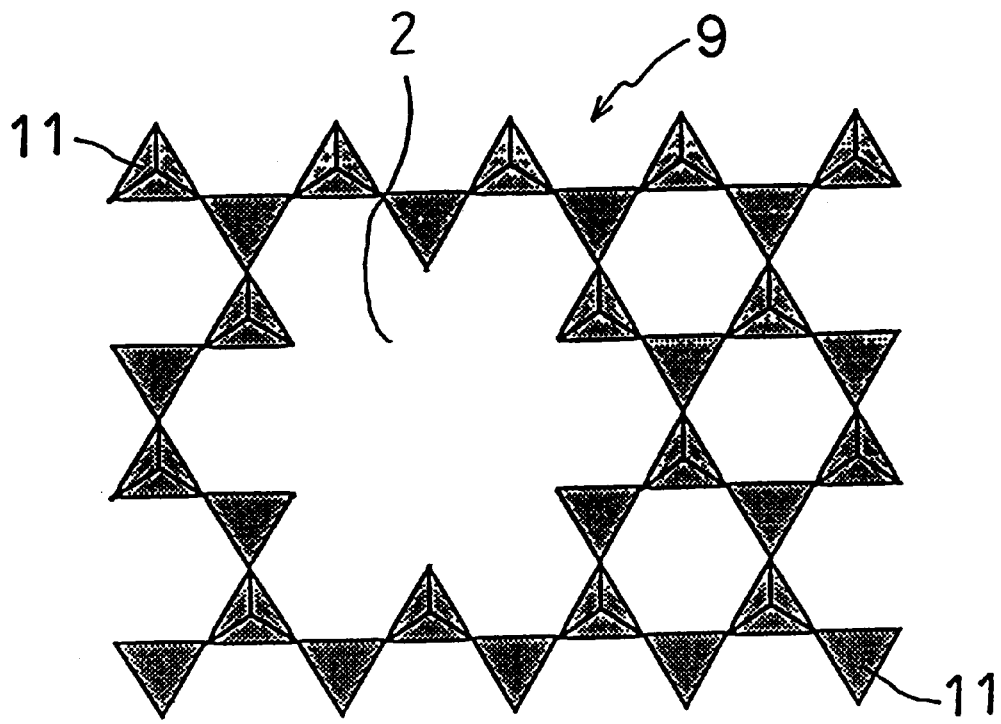
FIG. 4 is a plan view of the mesopore material derived from a silicon dioxide tetrahedron sheet as typically represented by its alternately-inverted structure.

The mesopore material of the invention shall have pores as formed by removing a desired number of the silicon dioxide tetrahedrons from the silicon dioxide tetrahedron sheet. The mesopore material is illustrated in FIG. 4 as its graphically-drawn plan view. As illustrated, some $SiO_4$ tetrahedrons 11 have dropped off from the $SiO_4$ tetrahedron layer 9 to give the pore 2.

The depth of each pore thus formed is nearly the same as the height of the $SiO_4$ tetrahedron, and is about 0.5 nm. Where a plurality of those sheets are laminated, the depth of each pore in the resulting laminate may be nearly the same as the thickness of the laminate, or may be smaller than about 50 nm or so. Because of the technical limitation that the pores are formed by the action of the alkylonium micelles formed, the pore size may be generally not smaller than 1.0 nm. The preferred pore size varies, depending on the use of the mesopore material, but may be, for example, about 3 nm or so. Where one and the same type of an alkylonium salt is used, uniform pores having a predetermined and the same pore size are formed.

The pores have a mean pore diameter ranging 1 to 10 nm in a pore distribution curve, and the pore with a diameter in a range of −40% to +40% of the mean pore diameter have a pore volume 40% or more of the total pore volume of the mesopore material. Preferably, the pore have a pore volume 60% or more of a total pore volume of the mesopore material.

The mean pore diameter here is defined as a diameter at which a vertical line parallel to the ordinate divides the integral of a pore distribution curve into two equal area parts.

Use of Mesopore Material

Use Example 1:

As has been mentioned hereinabove, the mesopore material is favorably used as a catalyst carrier.

Use Example 2:

The mesopore material is formed into sheets. For example, when an aqueous dispersion of a two-dimensional, for example, tabular mesopore material is cast onto a glass plate and dried thereon, a thin film sheet of the mesopore material is obtained. When the same aqueous dispersion is filtered through a porous filter, a thin film sheet of the mesopore material is deposited on the filter support.

The pores existing in those thin film sheets are oriented in the vertical direction relative to the sheet surface. Therefore, those exhibit high capabilities when used as filter membranes. For example, using any of those thin film sheets, a mixture solution or dispersion comprising a compound of which the molecular size is larger than the diameter of the pores in the sheets and a compound of which the molecular size is smaller than the same can be separated from each other.

Use Example 3:

An adsorbent comprising the mesopore material is formed. A fibrous or tubular mesopore material is mixed with a solution or melt of a thermoplastic polymer, and formed into a composite sheet. In the resulting composite sheet, the mesopore material dispersed effectively acts as an adsorbing component. Where a fibrous mesopore material is formed into such composite sheets or fibers, these exhibit excellent reinforcing capabilities as fillers in addition to the adsorbing capabilities.

Now, the invention is described in more detail hereinunder with reference to the following Examples, which, however, are not intended to restrict the scope of the invention.

EXAMPLE 1

In this Example, sepiolite, which is a clay mineral having a 2:1 layered structure of a sheet of silicon dioxide tetrahedrons and a sheet of magnesium oxide octahedrons and having a fibrous morphology, was processed with an acid under normal pressure to give a phyllo-silicic acid, and this was further processed into a mesopore material.

Starting Clay Mineral

Figure 5:
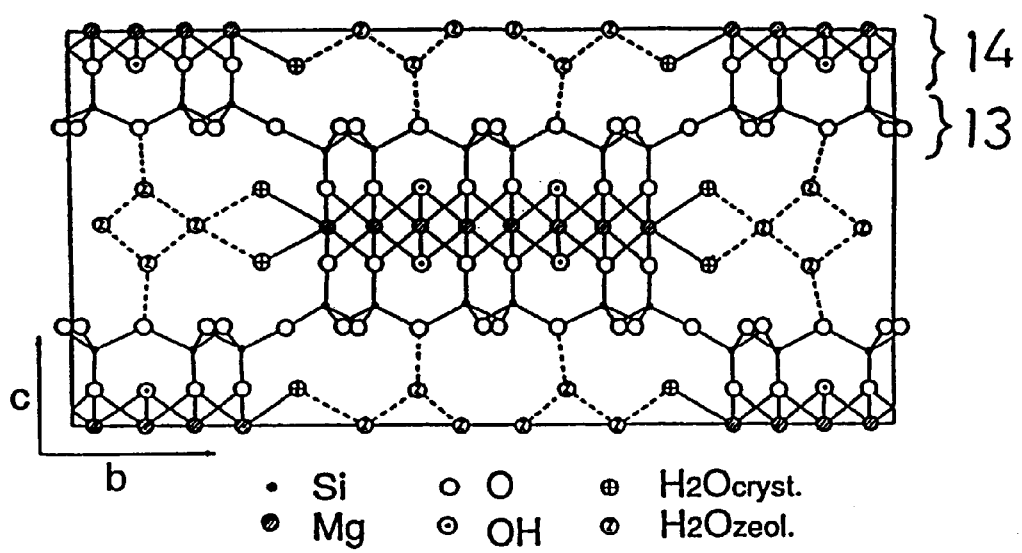
FIG. 5 is a known structural view of sepiolite.

Sepiolite used herein is β-type sepiolite from Turkey. Its structure is shown in FIG. 5. As illustrated, this comprises sheets 13 of block-inverted silicon dioxide tetrahedrons and sheets 14 of magnesium oxide octahedrons, in which the silicon dioxide tetrahedron sheets 13 are disposed adjacent to the both surfaces of each octahedron sheet 14.

Acid Treatment 250.0 g of sepiolite and 2000 ml of 3 N hydrochloric acid were put into a 3-liter separable flask equipped with a condenser, and heated in a water bath at 85° C. as the temperature in the water bath, for 10 hours, while being stirred with an electric stirrer.

The solid precipitate formed was taken out of the flask through filtration while being hot, and washed on a funnel with 1000 ml of hot 1 N hydrochloric acid and 2000 ml of hot ion-exchanged water both at from 70 to 90° C. or so. The resulting solid precipitate was put into a 3-liter separable flask equipped with a condenser, along with 2000 ml of 1 N hydrochloric acid, and heated in a water bath at 90° C. as the temperature in the water bath, for 1 hour, while being stirred with an electric stirrer. The solid precipitate thus formed was taken out of the flask through filtration, washed on a funnel with 3000 ml of hot ion-exchanged water, and then freeze-dried to obtain 115.4 g of an acid-processed product.

Removal of Humic Acid 55.0 g of the acid-processed product and 300 ml of an aqueous solution of 30% hydrogen peroxide were put into a 2-liter separable flask equipped with a condenser, and heated in a water bath at 80° C. as the temperature in the water bath, for 5 hours, while being stirred with an electric stirrer. The solid precipitate formed was separated from the reaction mixture through filtration, and washed on a funnel with 2000 ml of hot ion-exchanged water. The thus-washed solid precipitate was put into a 2-liter separable flask equipped with a condenser, along with 1500 ml of water, and heated under reflux for 1 hour in a water bath, while being stirred with an electric stirrer. The resulting solid precipitate was taken out through filtration, and dried. Another same amount of the acid-processed product was subjected to the same humic acid-removing treatment as above, and the two, humic acid-removed products obtained were combined to be 96.1 g in weight.

Activation of Surface Silanol Groups 87.0 g of the humic acid-removed product and 1000 ml of 1 N hydrochloric acid were put into a 2-liter separable flask equipped with a condenser, and heated under reflux for 2 hours in a water bath, while being stirred with an electric stirrer. The solid precipitate formed was taken out from the reaction mixture through filtration, washed on a funnel with 2000 ml of hot ion-exchanged water, and then freeze-dried to obtain 85.1 g of a product. This is a silicon dioxide tetrahedron sheet product, and is referred to as NS-1.

Analysis of NS-1

Figure 6:
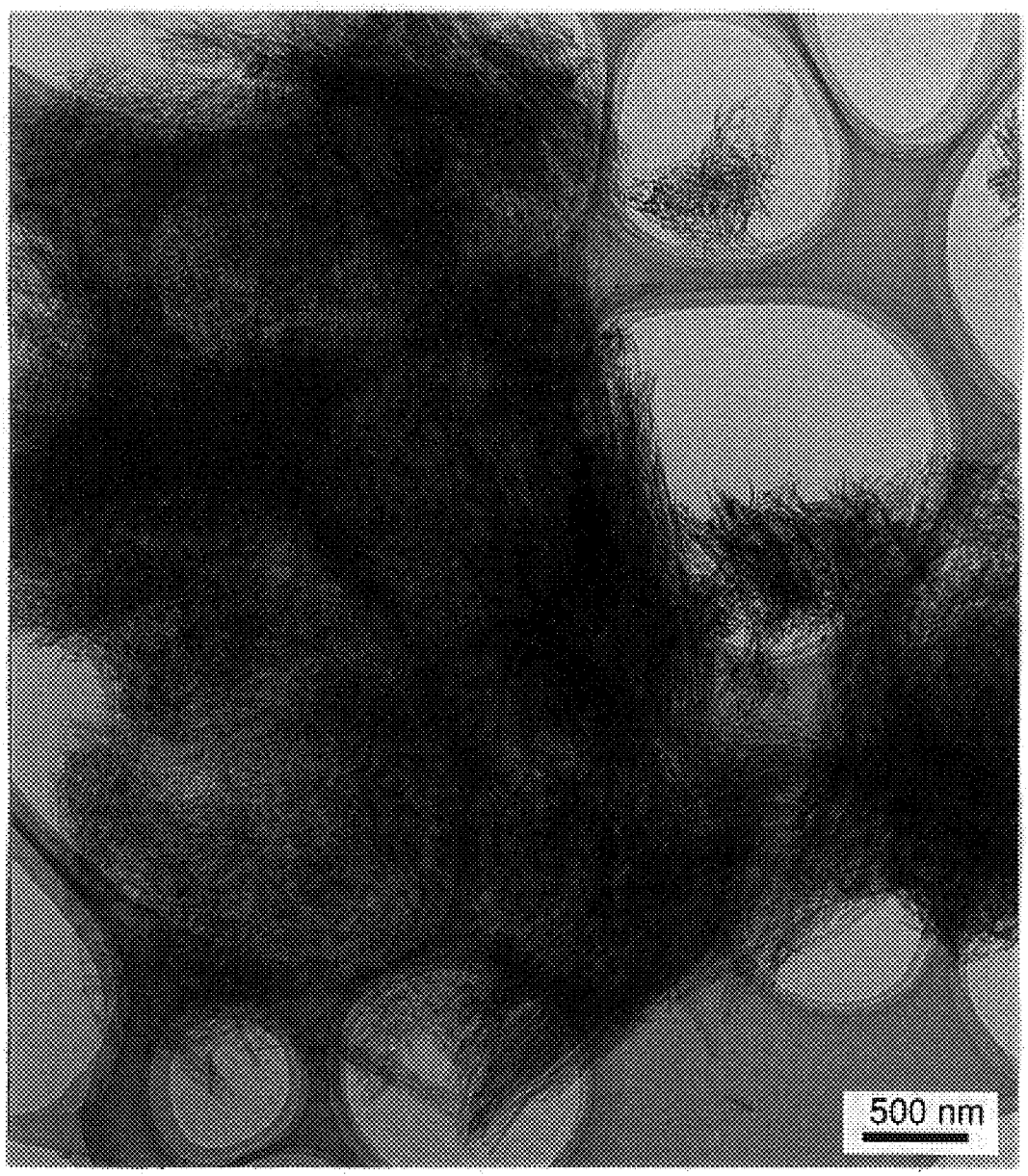
FIG. 6 is a picture taken by transmission electromicroscopic photography (×24,000), showing the structure of the silicon dioxide tetrahedron sheet of Example 1.
Figure 7:
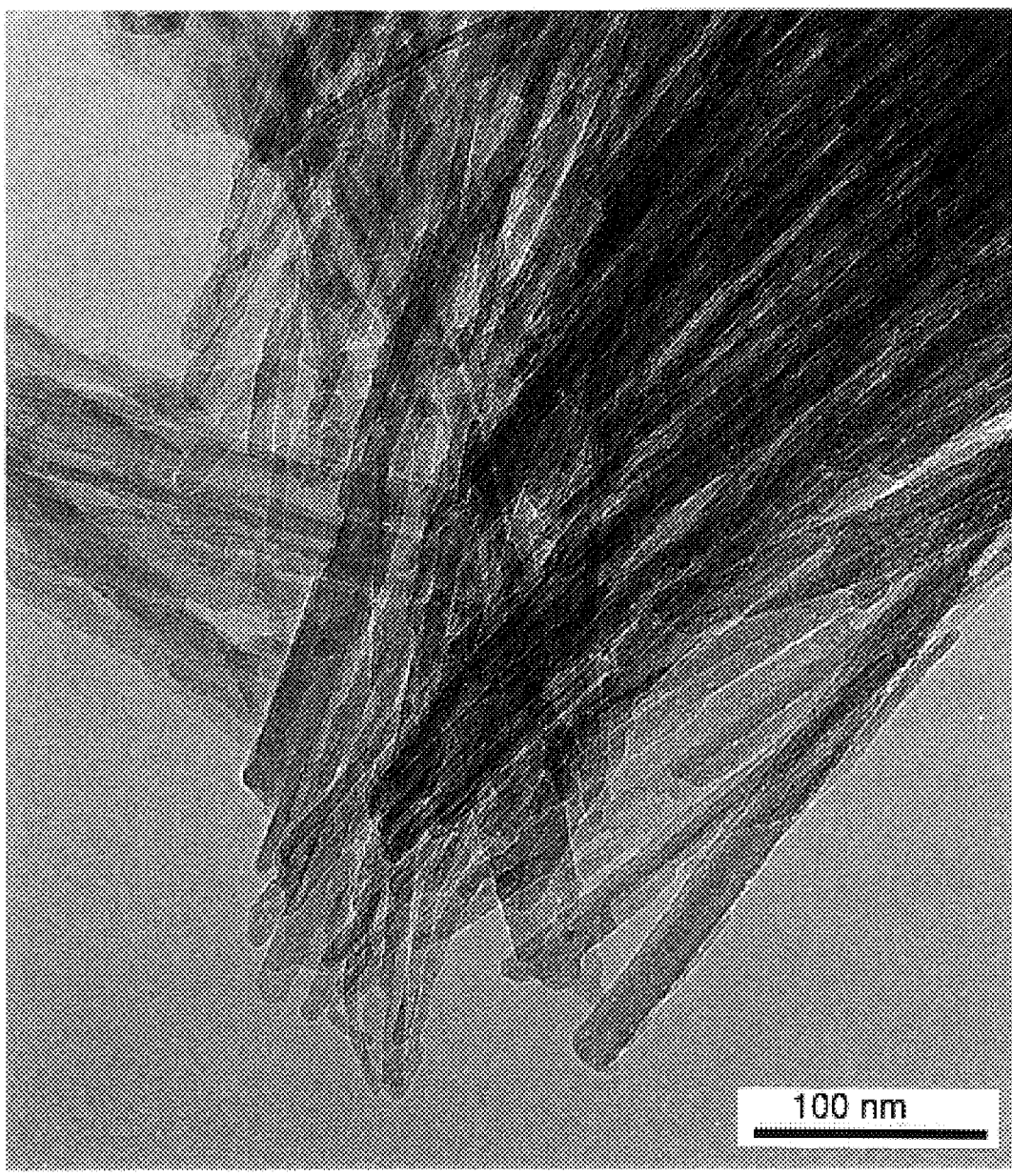
FIG. 7 is a picture taken by transmission electromicroscopic photography (×280,000), showing the structure of the silicon dioxide tetrahedron sheet of Example 1.

Pictures of NS-1 taken by transmission electromicroscopic photography are in FIG. 6 and FIG. 7, from which it is known that NS-1 has a layered structure of fibrous sheets each having a thickness of approximately from 5 to 20 nm and a length of not longer than about 3 μm, that the sheets constituting NS-1 are nearly the same in size, and that NS-1 has the pseudomorphs of the silicon dioxide tetrahedron sheets intrinsic to the starting sepiolite.

In FIG. 6, meshed patterns and thin gray fibrous sheet pieces overlying the patterns are seen. Those fibrous sheet pieces are NS-1. The meshed patterns comprising a gray background and a large number of circular nettings are images often seen in pictures taken by transmission electromicroscopy with low magnifications, and these images are of magnified parts of the stage of the transmission electromicroscope, on which the sample was set, and have no relation to NS-1. The same shall apply to the other pictures taken by transmission electromicroscopic photography and presented herewith.

The specific surface area of NS-1 was measured according to the BET method with nitrogen adsorption, to be 460 $m^2/g$.

The starting sepiolite used herein and the acid-processed, silicon dioxide tetrahedron sheet product (NS-1) obtained herein were subjected to elementary analysis, from which were obtained their atomic compositions. Table 1 shows the atomic compositions of the two, in terms of atomic percentage based on silicon atom, from which it is known that the metal atoms except silicon were removed from sepiolite by the acid treatment to give high-purity silicon dioxide.

TABLE 1

| | Elementary Composition (atomic percentage based on silicon atom) | | | | |
|---|---|---|---|---|---|
| | Si | Al | Fe | Mg | Ti |
| Sepiolite | 100 | 5.9 | 1.5 | 73 | 0.2 |
| NS-1 | 100 | 1.55 | 0.11 | 0.11 | 0.12 |

Processing of NS-1 with Alkylonium Hydroxide 3.0 g of cetyltrimethylammonium chloride was dispersed in 100 ml of ion-exchanged water under heat, to which was added 9.8 ml of an aqueous solution of 1 N sodium hydroxide and stirred to obtain an aqueous dispersion of cetyltrimethylammonium hydroxide. This aqueous dispersion and 7.5 g of NS-1 were put into the container in an autoclave having therein a cylindrical 300-ml Teflon container, and heated at 70° C. for 20 hours. After having been cooled, the solid precipitate formed was taken out through filtration, washed on an funnel with 100 ml of ion-exchanged water, dried, and calcined at 650° C. for 4 hours to obtain 4.75 g of a product. This is a mesopore material, and is hereinunder referred to as PS-1.

Analysis of PS-1

Figure 8:
FIG. 8 is a picture taken by transmission electromicroscopic photography (×110,000), showing the structure of the mesopore material of Example 1.
Figure 9:
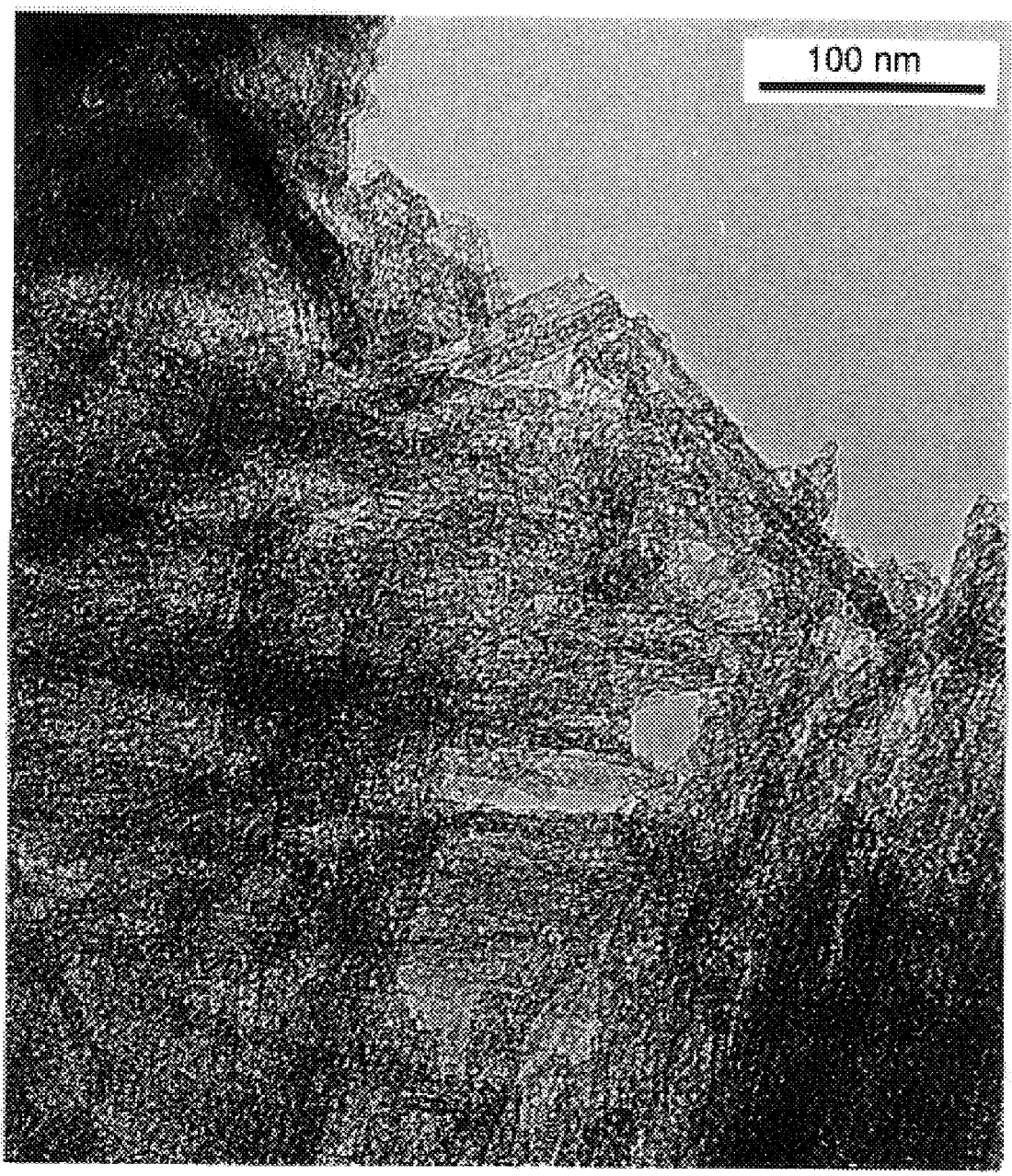
FIG. 9 is a picture taken by transmission electromicroscopic photography (×270,000), showing the structure of the mesopore material of Example 1.

Pictures of PS-1 taken by transmission electromicroscopic photography are in FIG. 8 and FIG. 9, from which it is known that PS-1 has pores as oriented in the vertical direction relative to the surface of the silicon dioxide tetrahedron sheet. In addition, it is further known therefrom that PS-1 has a structure of fibrous sheets each having a thickness of approximately from 5 to 20 nm and a length of not longer than about 3 μm, that the sheets constituting PS-1 are nearly the same in size, and that PS-1 has the pseudomorphs of the silicon dioxide tetrahedron sheets intrinsic to NS-1 and also to the starting sepiolite.

The specific surface area of PS-1 was measured according to the BET method with nitrogen adsorption, to be 1020 m$^2$/g.

Comparison Between NS-1 and PS-1

Based on their pictures taken through transmission electromicroscopic photography and the data of specific surface area, NS-1 and PS-1 were compared with each other, which verified that PS-1 had the pseudomorphs of the starting clay mineral and NS-1, while its specific surface area increased to be about two times that of NS-1. This will be essentially because of the formation of the pores in PS-1.

Measurement of Pore Distribution and XRD of PS-1

The pore distribution in PS-1 was determined through nitrogen adsorption according to the method mentioned below. First, a nitrogen adsorption isotherm for PS-1 was prepared using the apparatus mentioned below and according to the method also mentioned below. The apparatus used herein comprised a vacuum line with an absolute pressure transducer (Nippon MKS's Baratron 127AA Model) and a control valve (Nippon MKS's 248A Model) fitted thereto, and the measurement was effected through quantification. Precisely, about 40 mg of a sample of PS-1 was weighed and put into a sample tube, and degassed at room temperature for 2 hours. The degree of vacuum in the sample tube thus having been degassed for 2 hours was $10^{-3}$ Torr. Next, with dipping the sample tube in liquid nitrogen, the amount of nitrogen adsorbed by the sample was measured, from which was obtained a nitrogen adsorption isotherm for PS-1.

Figure 10:
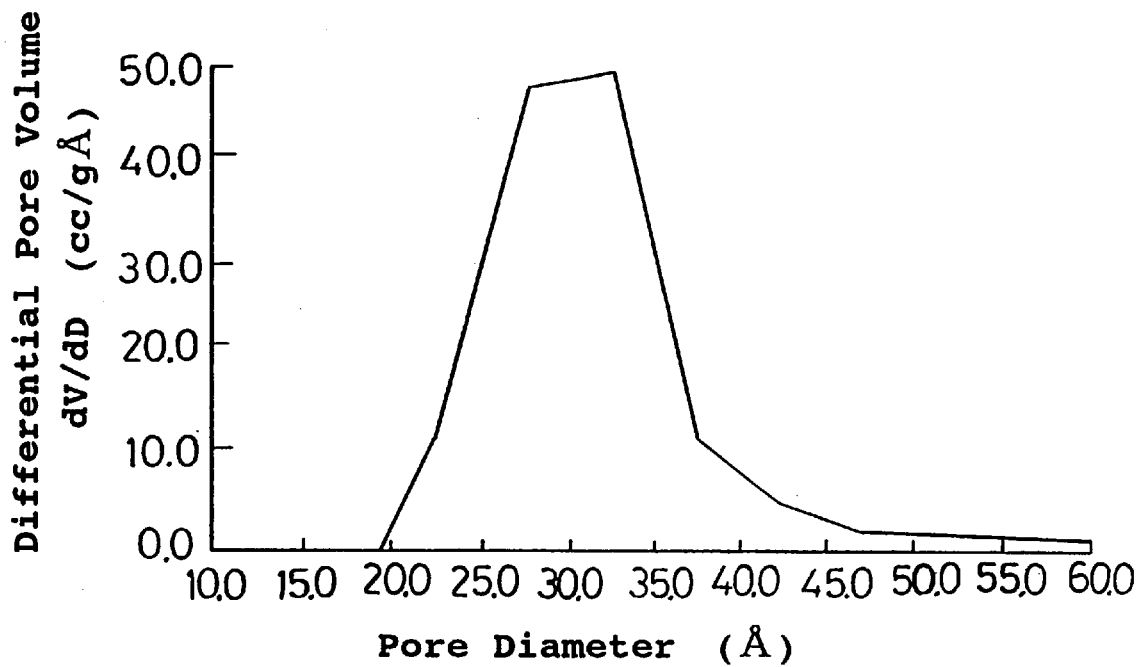
FIG. 10 is a graph of a pore distribution curve of the mesopore material of Example 1.

From the nitrogen adsorption isotherm, obtained was the pore distribution curve of the sample, PS-1, according to the Cranston-Inclay method. This is shown in FIG. 10. The mean pore diameter of the pores existing in the sample was obtained from the peak of the pore distribution curve, and was from 2.8 to 3.3 nm.

Based on FIG. 10, the ratio of the pore volume of the pores having a diameter in the range of −40% to +40% of the mean pore diameter to the overall pore volume (this ratio is referred to as "+/−40% porosity") was obtained to be 85%. This indicates high uniformity of the pore size in PS-1.

Figure 11:
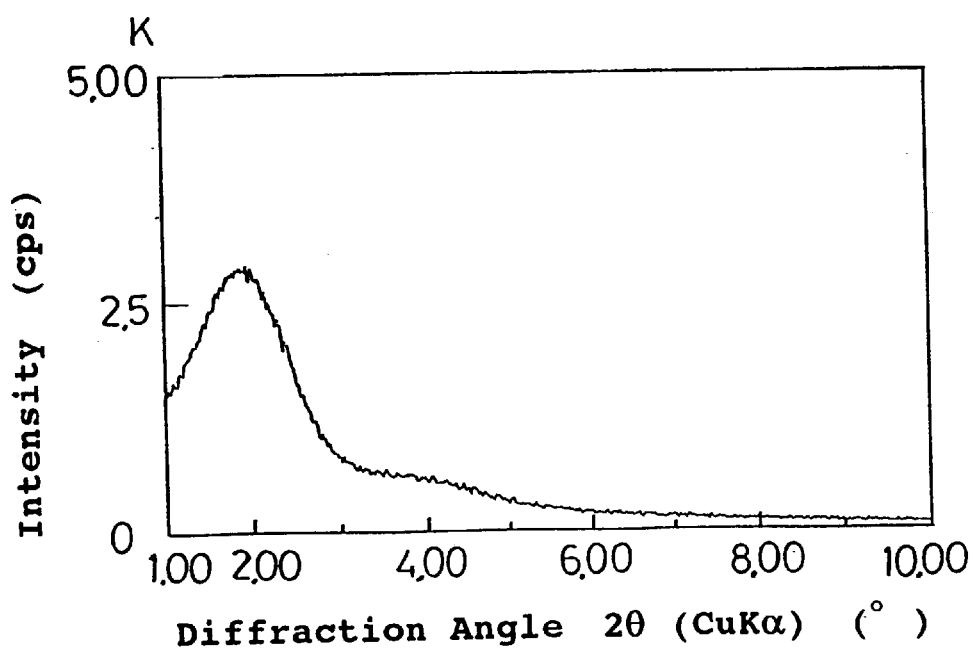
FIG. 11 is a X-ray diffraction pattern of the mesopore material of Example 1.

In this Example, PS-1 obtained gave the X-ray diffraction pattern as in FIG. 11, in which are seen broad peaks of the intensity at 2θ of around 2°, around 4° and around 6° with the intensity decreasing in that order. This will be because the mesopores that are vertical to the sheet surface and are uniform in size might exist irregularly in the two-dimensional direction of the sheet.

EXAMPLE 2

Starting Clay Mineral

Vermiculite, which is a clay mineral having a 2:1 layered structure of a sheet of silicon dioxide tetrahedrons and a sheet of octahedrons of aluminium, iron and magnesium oxides, was processed with an acid under normal pressure to give a phyllo-silicic acid. Vermiculite used herein is one from China.

Acid Treatment 40.0 g of vermiculite was put into a 500-ml beaker, to which was added 100 ml of an aqueous solution of 30% hydrogen peroxide. Thus, vermiculite was oxidized, and expanded while generating heat.

This beaker was left at room temperature for 1 hour, and then put in a drier at a fixed temperature of 55° C. for 3 days, whereby the sample, vermiculite being oxidized in the beaker was ripened. The reason for the expansion of the thus-oxidized vermiculite will be because the interlayer water existing therein might have boiled due to the heat of oxidization of the iron powder in the vermiculite composition, thereby resulting in the expansion of the layer-to-layer space and in the interlayer peeling.

Next, the thus-oxidized vermiculite and 1200 ml of 3 N hydrochloric acid were put into a 2-liter separable flask equipped with a condenser, and heated in a water bath at 95° C. as the temperature in the water bath, for 8 hours, while being stirred with an electric stirrer. The solid precipitate formed was taken out of the flask through filtration while being hot, and washed on a funnel with 600 ml of hot 1 N hydrochloric acid and 800 ml of hot ion-exchanged water both at from 70 to 90° C. or so.

The resulting solid precipitate was put into a 2-liter separable flask equipped with a condenser, along with 400 ml of 1 N hydrochloric acid, and heated in a water bath at 90° C. as the temperature in the water bath, for 1 hour, while being stirred with an electric stirrer. The solid precipitate thus formed was taken out of the flask through filtration, washed on a funnel with 2000 ml of hot ion-exchanged water, and then freeze-dried to obtain 14.7 g of a product. This is a silicon dioxide tetrahedron sheet product, and is referred to as NV-2.

Analysis of NV-2

Figure 12:
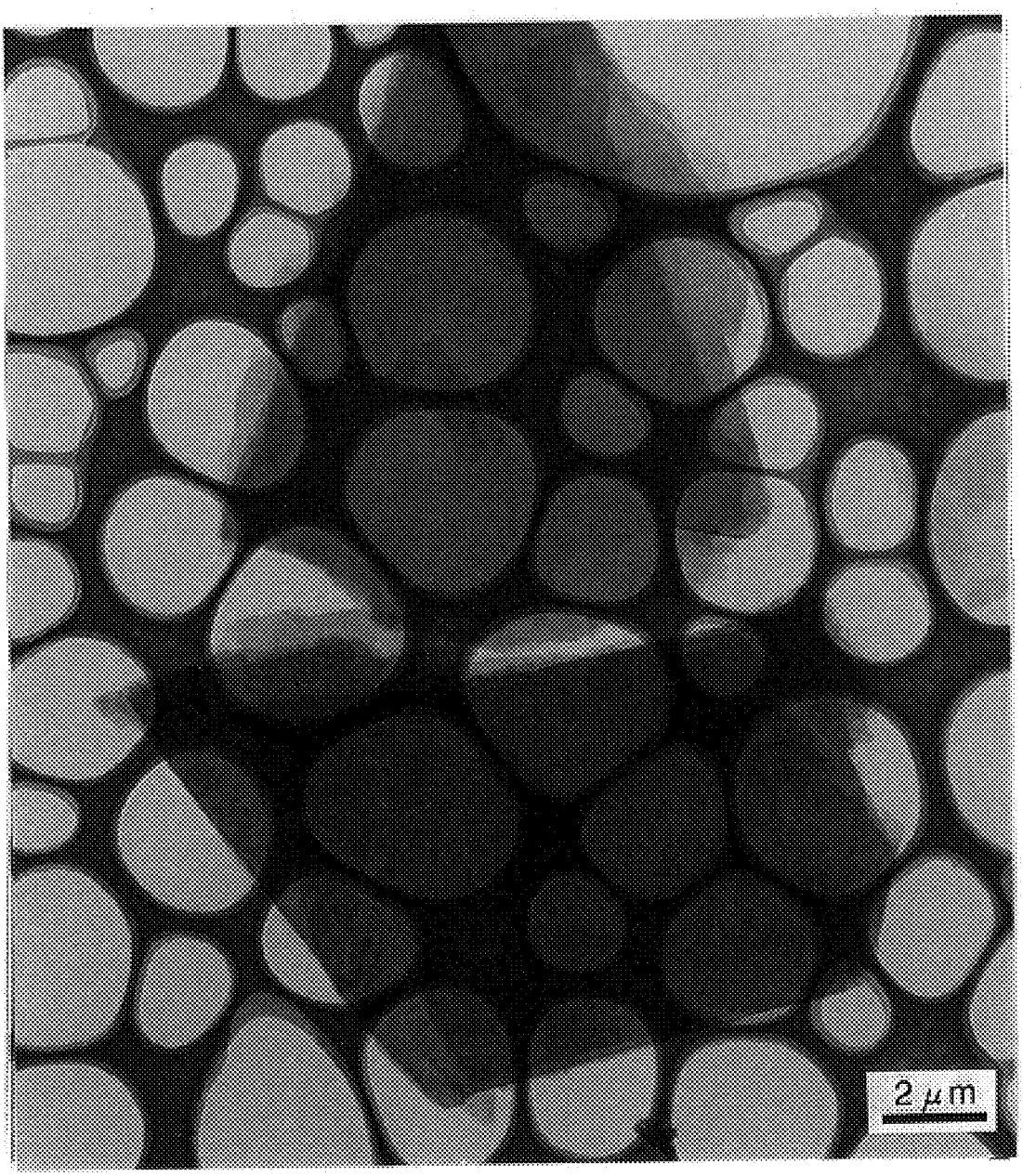
FIG. 12 is a picture taken by transmission electromicroscopic photography (×6,000), showing the structure of the silicon dioxide tetrahedron sheet of Example 2.
Figure 13:
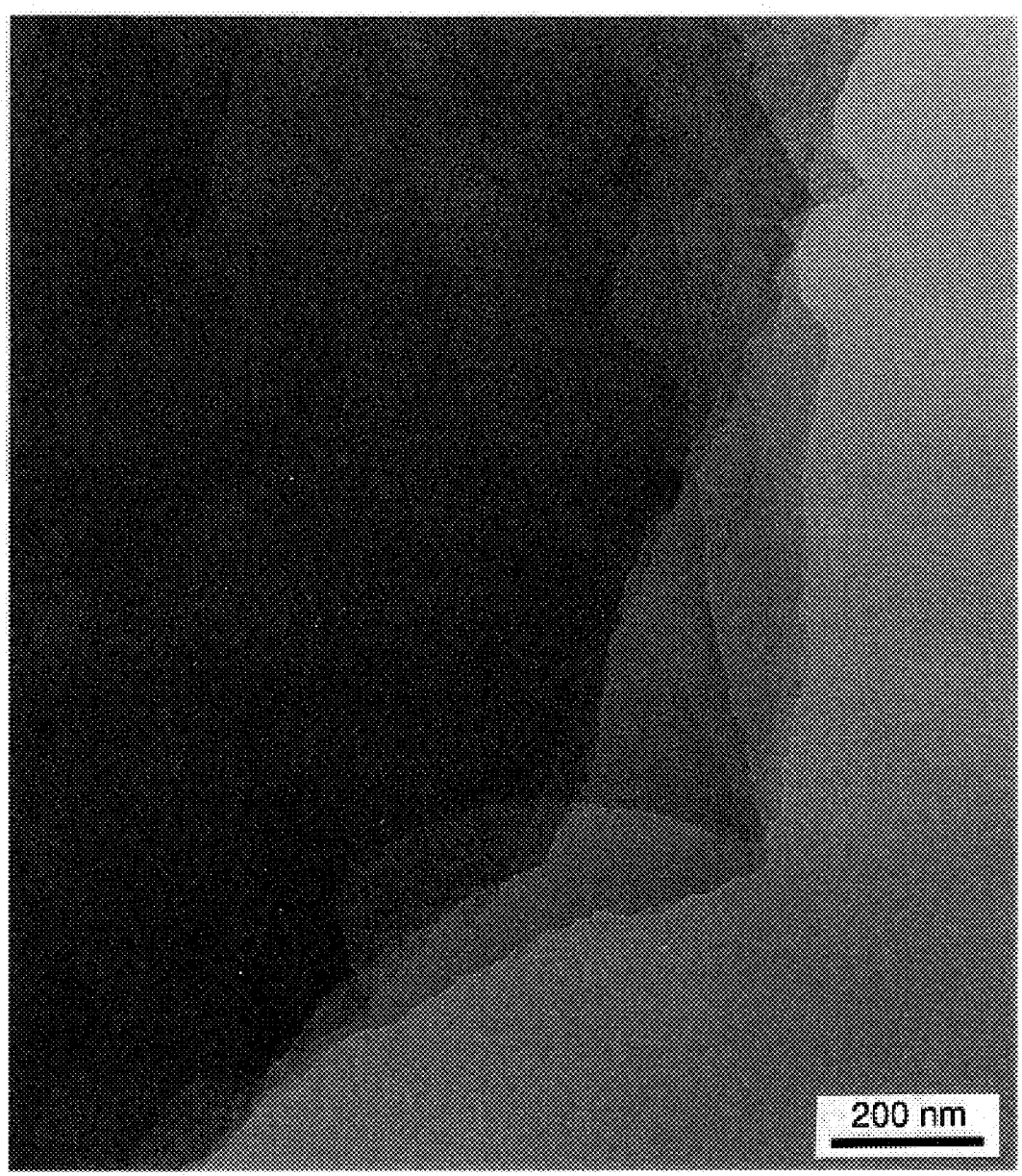
FIG. 13 is a picture taken by transmission electromicroscopic photography (×95,000), showing the structure of the silicon dioxide tetrahedron sheet of Example 2.

Pictures of NV-2 taken by transmission electromicroscopic photography are in FIG. 12 and FIG. 13, from which it is known that NV-2 has a layered structure of a plurality of tabular sheets each having a size of approximately from 7 to 11 82 m, that the tabular sheets are nearly the same in size, and that NV-2 has the pseudomorphs of the silicon dioxide tetrahedron sheets intrinsic to the starting clay mineral of vermiculite.

In the photographs of FIG. 12 and FIG. 13, each layer of the layered structure is seemingly seen to be composed of one tabular sheet, but, in fact, it is surely composed of a plurality of tabular sheets.

The specific surface area of NV-2 was measured according to the BET method with nitrogen adsorption, to be 440 m$^2$/g.

The starting vermiculite used herein and the acid-processed silicon dioxide tetrahedron sheet product (NV-2) obtained herein were subjected to elementary analysis, from which were obtained their atomic compositions. Table 2 shows the atomic compositions of the two, in terms of atomic percentage based on silicon atom, from which it is known that the metal atoms except silicon were removed from vermiculite by the acid treatment to give high-purity silicon dioxide.

TABLE 2

| | Elementary Composition (atomic percentage based on silicon atom) | | | | |
|---|---|---|---|---|---|
| | Si | Al | Fe | Mg | Ti |
| Vermiculite | 100 | 50 | 50 | 50 | 6.4 |
| NV-2 | 100 | 0.35 | 0.13 | 0.03 | 0.06 |

Processing of NV-2 with Alkylonium Hydroxide

Herein using 2.0 g of cetyltrimethylammonium chloride, 200 ml of ion-exchanged water, 6.3 ml of an aqueous solution of 1 N sodium hydroxide, and 5.0 g of NV-2, 4.5 g of a mesopore material was obtained in the same manner as in Example 1. This is referred to as PV-2.

Analysis of PV-2

Figure 14:
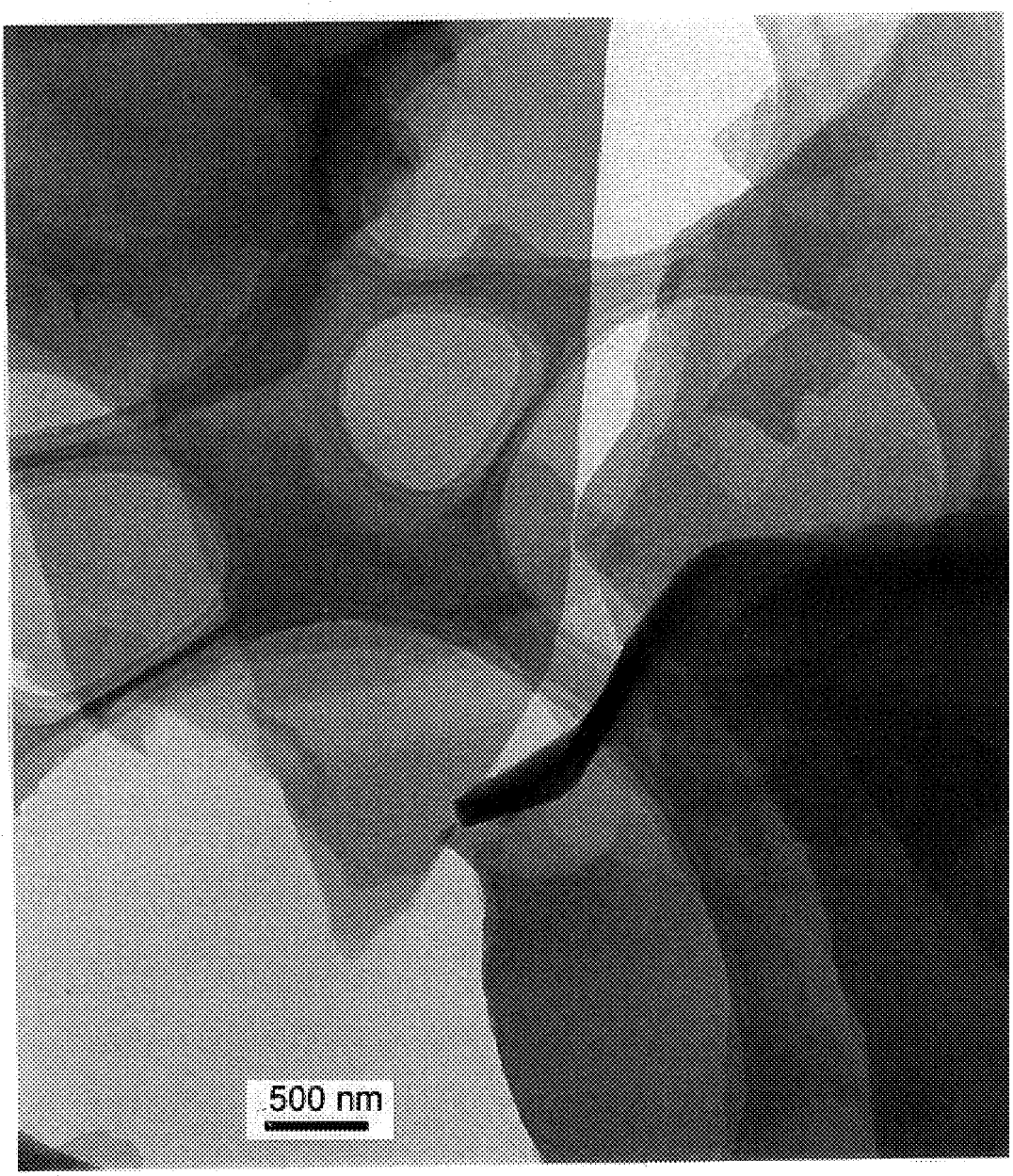
FIG. 14 is a picture taken by transmission electromicroscopic photography (×24,000), showing the structure of the mesopore material of Example 2.
Figure 15:
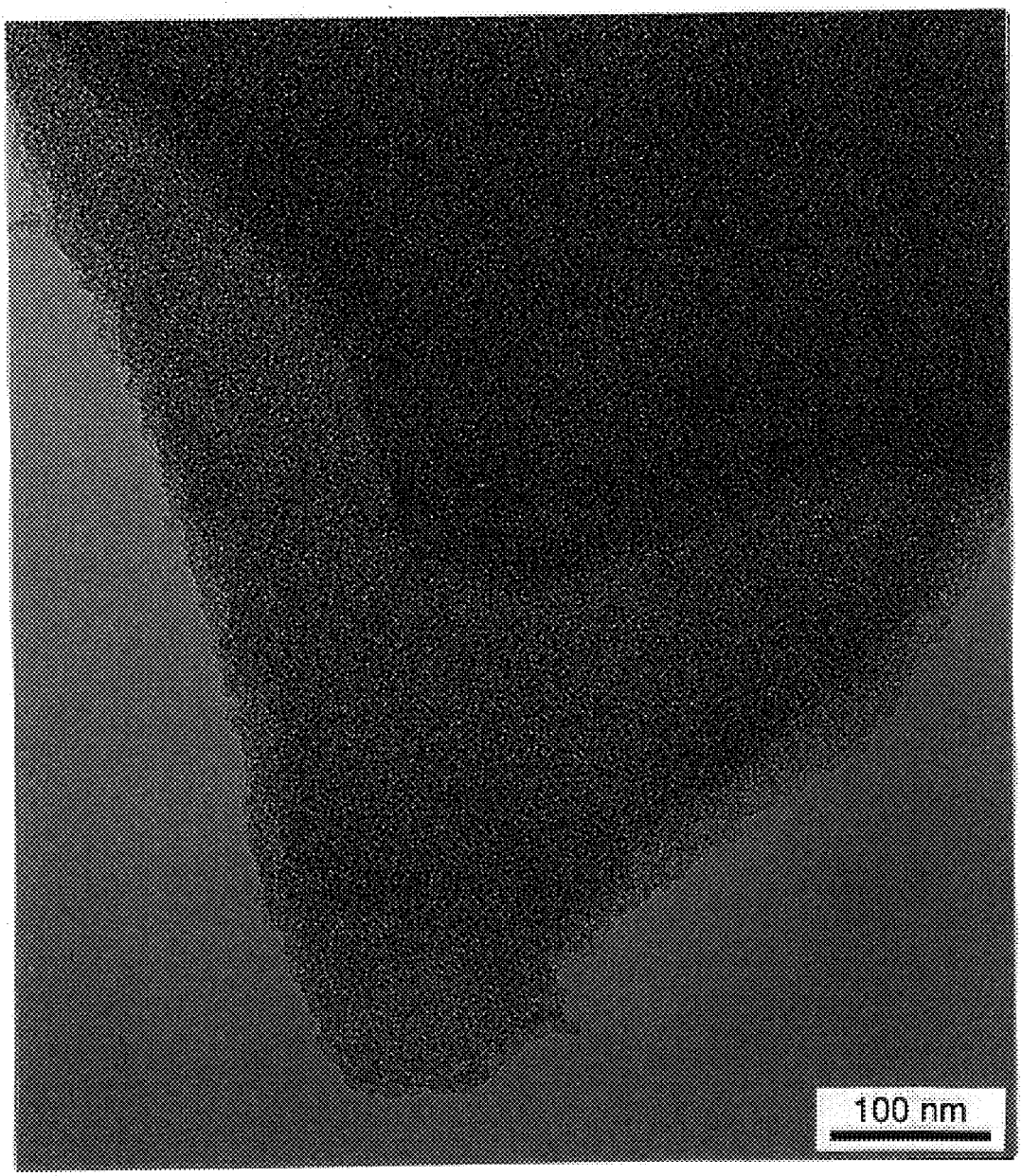
FIG. 15 is a picture taken by transmission electromicroscopic photography (×190,000), showing the structure of the mesopore material of Example 2.

Pictures of PV-2 taken by transmission electromicroscopic photography are in FIG. 14 and FIG. 15, from which it is known that PV-2 has pores as oriented in the vertical direction relative to the surface of the silicon dioxide tetrahedron sheet. In addition, it is further known therefrom that PV-2 has a layered structure of a plurality of tabular sheets each having a thickness of approximately from 7 to 11 82 m, that the tabular sheets are nearly the same in size, and that PV-2 has the pseudomorphs of the silicon dioxide tetrahedron sheets intrinsic to NV-2 and also to the starting vermiculite.

The specific surface area of PV-2 was measured according to the BET method with nitrogen adsorption, to be 630 m$^2$/g.

Comparison Between NV-2 and PV-2

Based on their pictures taken through transmission electromicroscopic photography and the data of specific surface area, NV-2 and PV-2 were compared with each other, which verified that PV-2 had the pseudomorphs of the starting clay mineral and NV-2, while its specific surface area increased to be about 1.5 times that of NV-2. This will be essentially because of the formation of the pores in PV-2.

Measurement of Pore Distribution and XRD of PV-2

Figure 16:
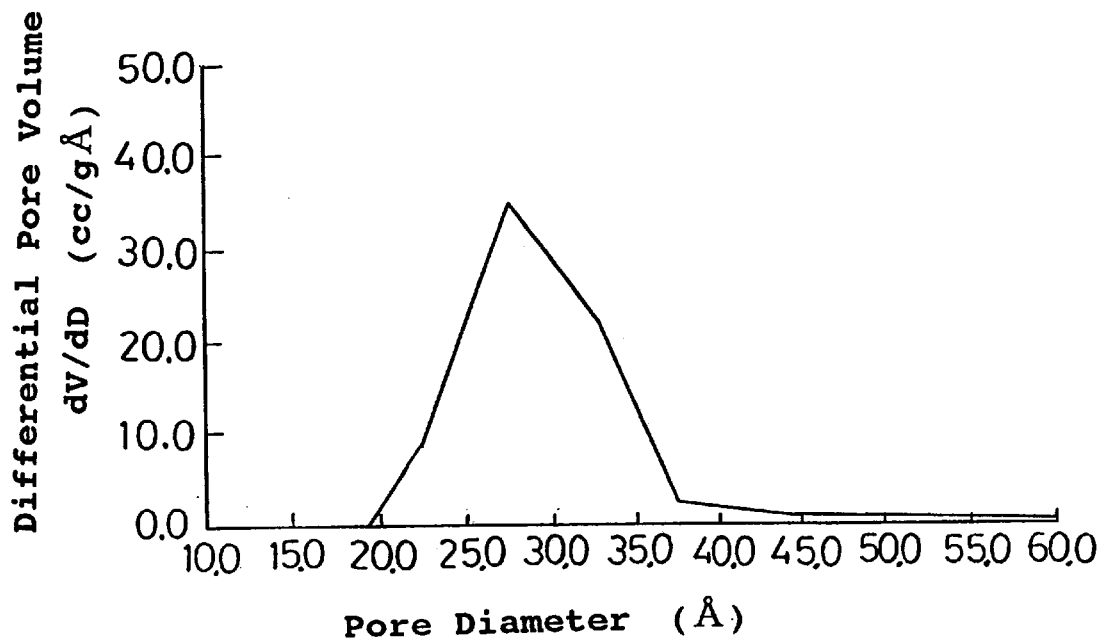
FIG. 16 is a graph of a pore distribution curve of the mesopore material of Example 2.

The pore distribution in PV-2 was determined in the same manner as in Example 1. The pore distribution curve of PV-2 is shown in FIG. 16. The mean pore diameter of the pores existing in the sample, PV-2 was obtained from the peak of the pore distribution curve, and was 2.7 nm.

Next, also in the same manner as in Example 1, the ratio of the pore volume of the pores having a diameter in the range of −40% to +40% of the mean pore diameter to the overall pore volume (this ratio is referred to as "+/−40% porosity") was obtained to be 83%. This indicates high uniformity of the pore size in PV-2.

Figure 17:
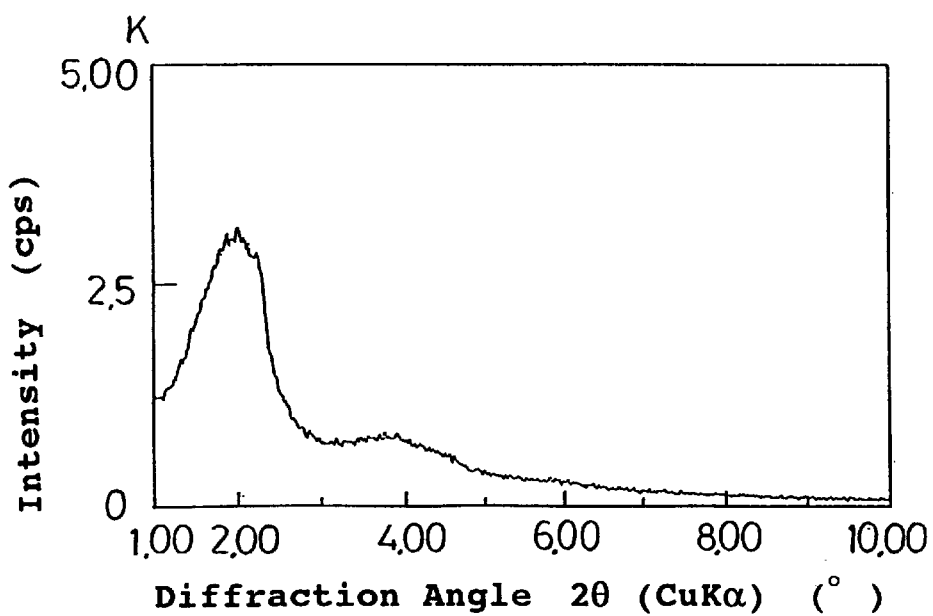
FIG. 17 is a X-ray diffraction pattern of the mesopore material of Example 2.

In this Example, PV-2 obtained gave the X-ray diffraction pattern as in FIG. 17, in which are seen broad peaks of the intensity at 2θ of around 2°, around 4° and around 6° with the intensity decreasing in that order. This will be because the mesopores that are vertical to the sheet surface and are uniform in size might exist irregularly in the two-dimensional direction of the sheet.

EXAMPLE 3

Starting Clay Mineral

Crysotile, which is a clay mineral having a 1:1 layered structure of a sheet of silicon dioxide tetrahedrons and a sheet of magnesium oxide octahedrons, was processed with an acid under increased pressure to give a phyllo-silicic acid. Crysotile used herein is Union Carbide's Calidria Asbestos H.P.P.

Acid Treatment 20 g of crysotile as previously ground in a mortar, and 40 ml of 12 N sulfuric acid were put into the container of an autoclave having therein a cylindrical 100-ml Teflon container, and sealed. Next, this was heated in a drier at a fixed temperature of 120° C. for 19 hours with stirring. After having been cooled, the solid precipitate formed was separated through filtration, and washed on a funnel with 600 ml of ion-exchanged water.

The resulting solid precipitate was put into a 500-ml separable flask equipped with a condenser, along with 350 ml of 1 N hydrochloric acid, and heated in an oil bath at 100° C. as the temperature in the oil bath, for 1 hour, while being stirred with an electric stirrer. The solid precipitate thus formed was taken out of the flask through filtration, washed on a funnel with 500 ml of hot ion-exchanged water, and then freeze-dried to obtain 3.4 g of a product. This is a silicon dioxide tetrahedron sheet product, and is referred to as NC-3.

Analysis of NC-3

Figure 18:
FIG. 18 is a picture taken by transmission electromicroscopic photography (×7,200), showing the structure of the silicon dioxide tetrahedron sheet of Example 3.
Figure 19:
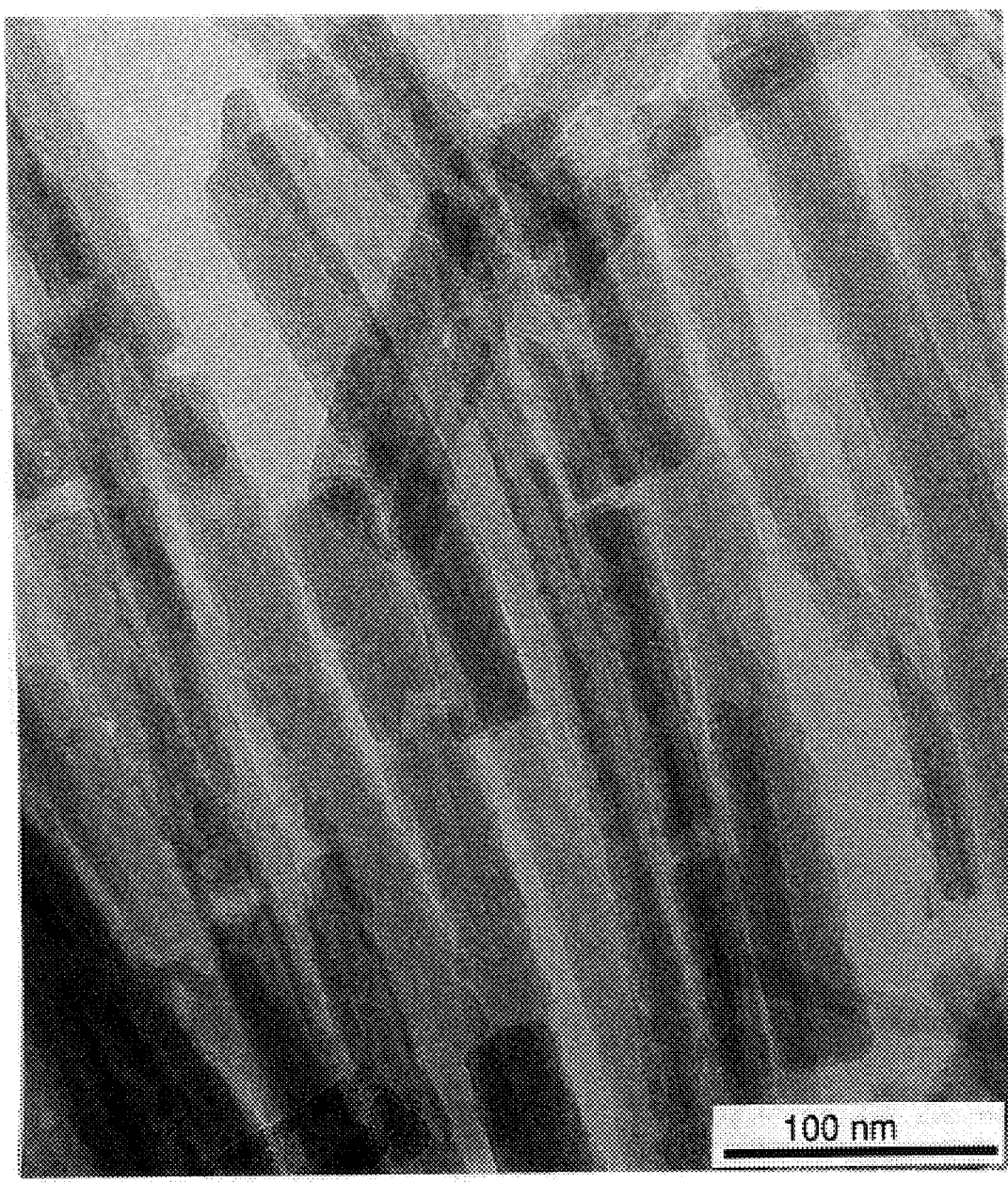
FIG. 19 is a picture taken by transmission electromicroscopic photography (×330,000), showing the structure of the silicon dioxide tetrahedron sheet of Example 3.

Pictures of NC-3 taken by transmission electromicroscopic photography are in FIG. 18 and FIG. 19, from which it is known that NC-3 has a columnar or tubular layered structure of tabular sheets having a diameter of about 30 nm, that the columnar- or tubular-wound sheets are nearly the same in diameter, and that NC-3 has the pseudomorphs of the silicon dioxide tetrahedron sheets intrinsic to the starting clay mineral of crysotile.

The specific surface area of NC-3 was measured according to the BET method with nitrogen adsorption, to be 170 m$^2$/g.

The starting crysotile used herein and the acid-processed, silicon dioxide tetrahedron sheet product (NC-3) obtained herein were subjected to elementary analysis, from which were obtained their atomic compositions. Table 3 shows the atomic compositions of the two, in terms of atomic percentage based on silicon atom, from which it is known that the metal atoms except silicon were removed from crysotile by the acid treatment to give high-purity silicon dioxide.

TABLE 3

| | Elementary Composition (atomic percentage based on silicon atom) | | | | |
|---|---|---|---|---|---|
| | Si | Al | Fe | Mg | Ti |
| Crysotile | 100 | 1.6 | 6.3 | 162 | 0 |
| NC-3 | 100 | 0.05 | 0.12 | 1.11 | 0 |

Processing of NC-3 with Alkylonium Hydroxide

Herein using 2.0 g of cetyltrimethylammonium chloride, 200 ml of ion-exchanged water, 6.3 ml of an aqueous solution of 1 N sodium hydroxide, and 5.0 g of NC-3, obtained was 4.7 g of a mesopore material in the same manner as in Example 1. This is referred to as PC-3.

Analysis of PC-3

Figure 20:
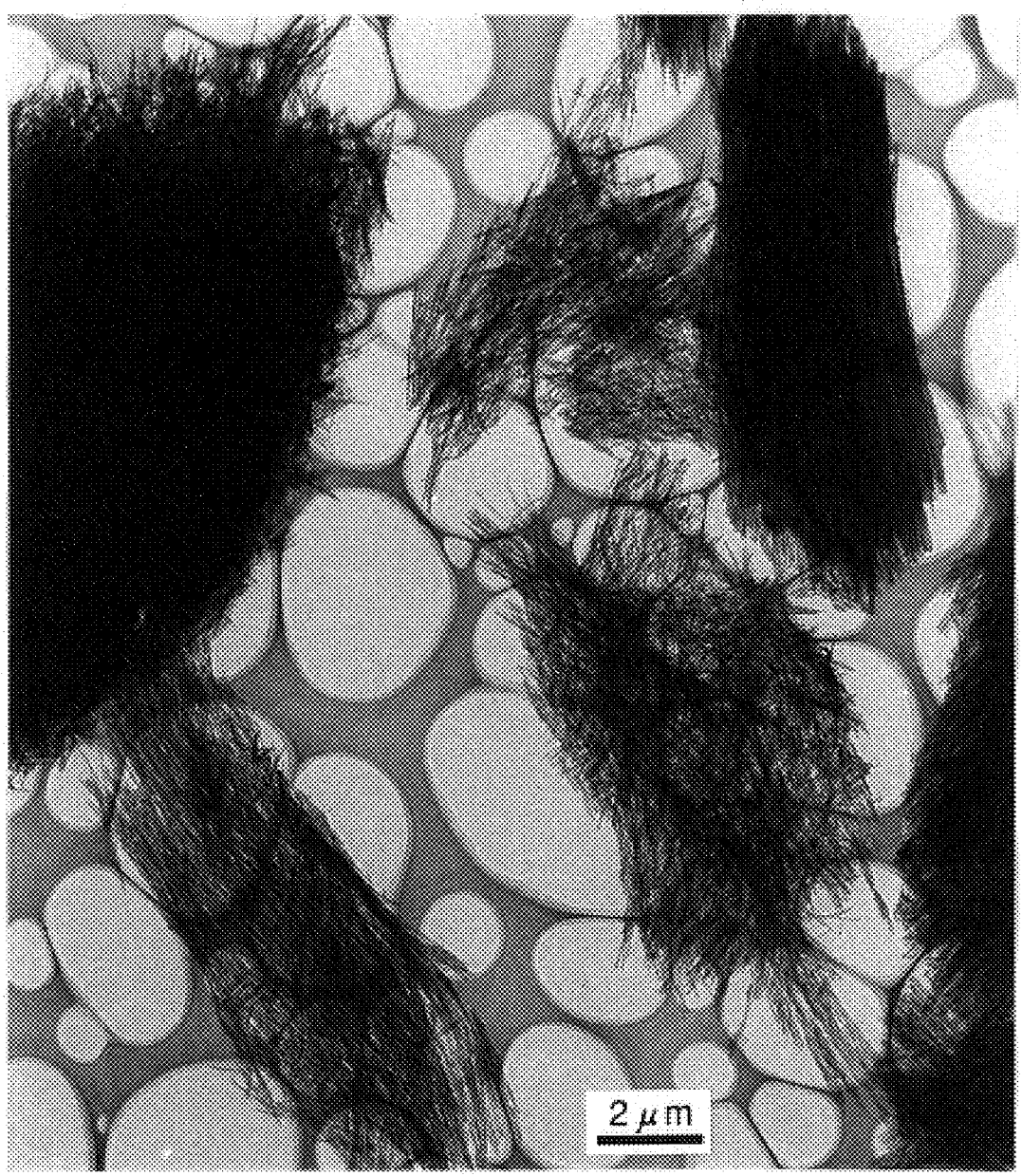
FIG. 20 is a picture taken by transmission electromicroscopic photography (×6,000), showing the structure of the mesopore material of Example 3.
Figure 21:
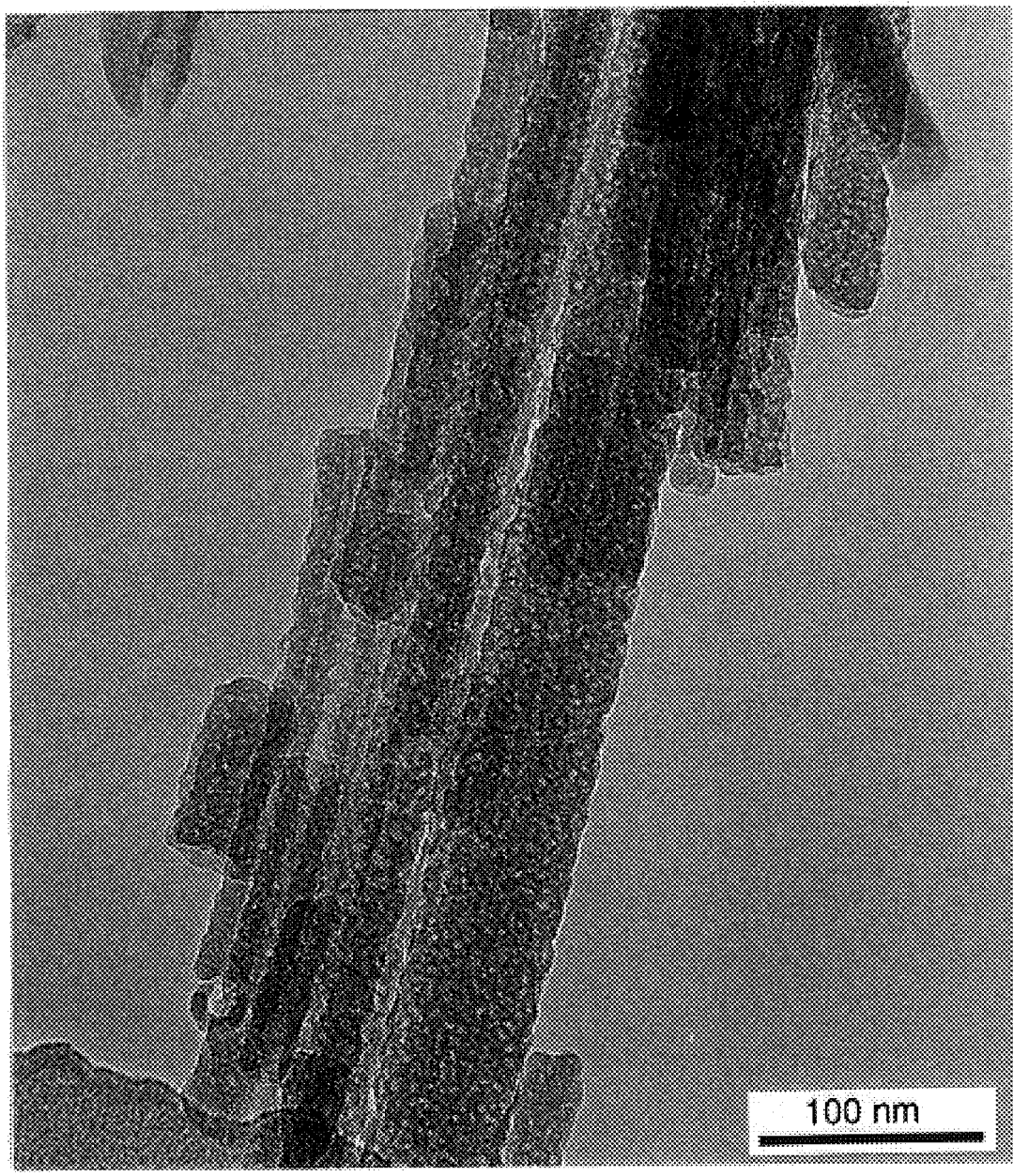
FIG. 21 is a picture taken by transmission electromicroscopic photography (×270,000), showing the structure of the mesopore material of Example 3.

Pictures of PC-3 taken by transmission electromicroscopic photography are in FIG. 20 and FIG. 21, from which it is known that PC-3 has pores as oriented in the vertical direction relative to the surface of the silicon dioxide tetrahedron sheet. In addition, it is further known therefrom that PC-3 has a columnar or tubular layered structure having a diameter of about 30 nm and a length of approximately from 2 to 7 μm or smaller, that the columnar or tubular structure made by winding tabular sheets are nearly the same in diameter, and that PC-3 has the pseudomorphs of the silicon dioxide tetrahedron sheets intrinsic to NC-3 and also to the starting crysotile.

The specific surface area of PC-3 was measured according to the BET method with nitrogen adsorption, to be 320 m$^2$/g.

Comparison Between NC-3 and PC-3

Based on their pictures taken through transmission electromicroscopic photography and the data of specific surface area, NC-3 and PC-3 were compared with each other, which verified that PC-3 had the pseudomorphs of the starting clay mineral and NC-3, while its specific surface area increased to be about 2 times that of NC-3. This will be essentially because of the formation of the pores in PC-3.

Measurement of Pore Distribution and XRD of PC-3

Figure 22:
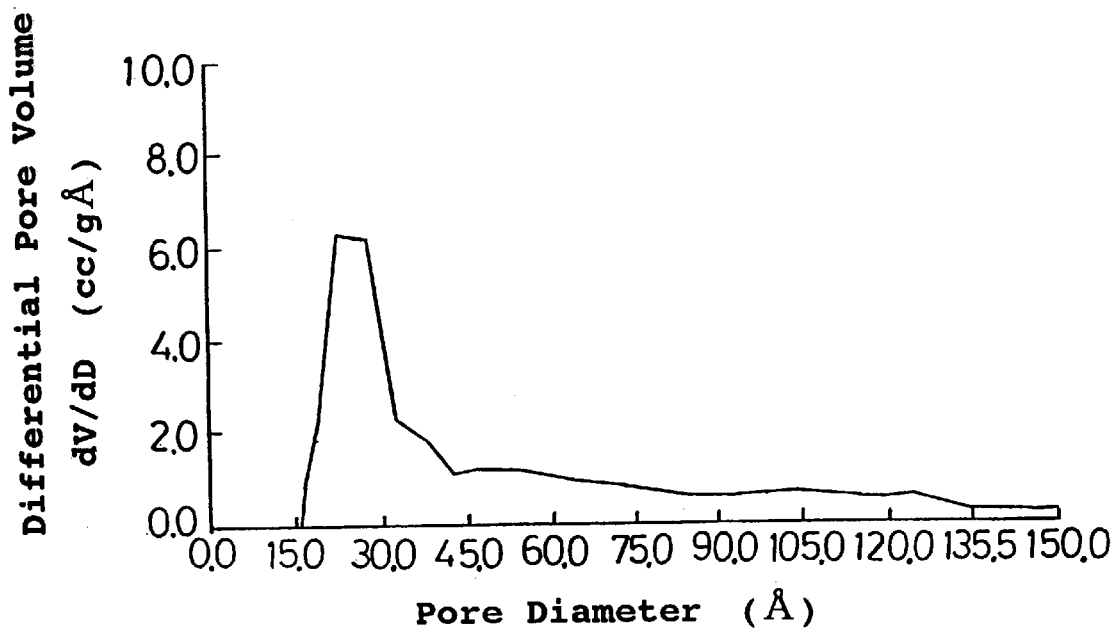
FIG. 22 is a graph of a pore distribution curve of the mesopore material of Example 3.

The pore distribution in PC-3 was determined in the same manner as in Example 1. The pore distribution curve of PC-3 is shown in FIG. 22. The mean pore diameter of the pores existing in the sample, PC-3 was obtained from the peak of the pore distribution curve, and was from 2.3 to 2.8 nm.

Next, also in the same manner as in Example 1, the ratio of the pore volume of the pores having a diameter in the range of −40% to +40% of the mean pore diameter to the overall pore volume (this ratio is referred to as "+/−40% porosity") was obtained to be 40%. This value will be because PC-3 might have many mesopores based on the tubular-structured silicon dioxide tetrahedron sheets and having a mean pore diameter of 3 nm or larger.

Figure 23:
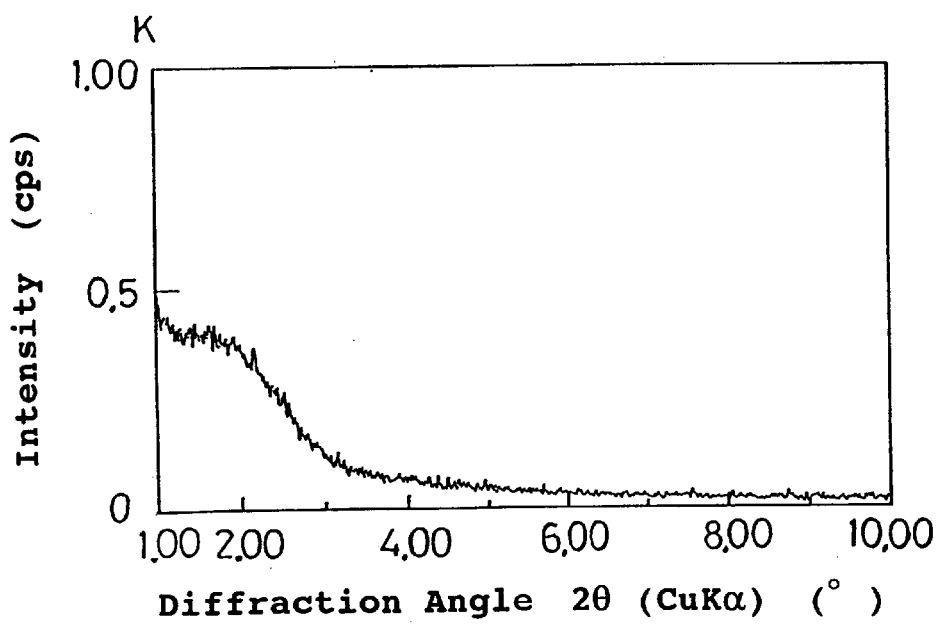
FIG. 23 is a X-ray diffraction pattern of the mesopore material of Example 3.

In this Example, PC-3 obtained gave the X-ray diffraction pattern as in FIG. 23, in which are seen broad peaks of the intensity at 2θ of around 2° and around 4° with the intensity decreasing in that order. This will be because the mesopores that are vertical to the sheet surface and are uniform in size might exist irregularly in the two-dimensional direction of the sheet.

EXAMPLE 4

The same process as in Example 1 was repeated, except that the step of "Processing NS-1 with Alkylonium Hydroxide" was replaced by the step of "Processing Silicon Dioxide Tetrahedron Sheet with Alkylonium Hydroxide" mentioned below. The data of the product analyzed were the same as those in Example 1.

Processing of Silicon Dioxide Tetrahedron Sheet with Alkylonium Hydroxide 15.0 g of a solution of 25% cetyltrimethylammonium hydroxide in methanol was put into the Teflon container of an autoclave having therein a cylindrical Teflon container, and its solvent was removed by purging with nitrogen. Then, this was dispersed in 200 ml of ion-exchanged water, to which was added 5.0 g of a silicon dioxide tetrahedron sheet, sealed, and heated at 70° C. for 20 hours. After having been cooled, the solid precipitate formed was separated through filtration, washed on a funnel with 100 ml of ion-exchanged water, dried, and then calcined at 650° C. for 4 hours to obtain 4.23 g of a product.

EXAMPLE 5

The same process as in Example 2 was repeated, except that the step of "Processing NV-2 with Alkylonium Hydroxide" was replaced by the step of "Processing Silicon Dioxide Tetrahedron Sheet with Alkylonium Hydroxide" mentioned below. The data of the product analyzed were the same as those in Example 2.

Processing of Silicon Dioxide Tetrahedron Sheet with Alkylonium Hydroxide

Herein using 15.0 g of a solution of 25% cetyltrimethylammonium hydroxide in methanol, 200 ml of ion-exchanged water and 5.0 g of a silicon dioxide tetrahedron sheet, the sheet was processed in the same manner as in Example 1 to obtain 4.36 g of a mesopore material.

EXAMPLE 6

The same process as in Example 3 was repeated, except that the step of "Processing NC-3 with Alkylonium Hydroxide" was replaced by the step of "Processing Silicon Dioxide Tetrahedron Sheet with Alkylonium Hydroxide" mentioned below. The data of the product analyzed were the same as those in Example 3.

Processing of Silicon Dioxide Tetrahedron Sheet with Alkylonium Hydroxide

Herein using 15.0 g of a solution of 25% cetyltrimethylammonium hydroxide in methanol, 200 ml of ion-exchanged water and 5.0 g of a silicon dioxide tetrahedron sheet, the sheet was processed in the same manner as in Example 1 to obtain 4.11 g of a mesopore material.

EXAMPLE 7

Starting Clay Mineral

Hectorite, which is a clay mineral having a 2:1 layered structure of a sheet of non-inverted silicon dioxide tetrahedrons and a sheet of octahedrons of magnesium oxide, was processed with an acid under normal pressure to give a phyllo-silicic acid with no crystallographic regularity.

Hectorite used herein is a standard sample of the US Clay Society (SHCa-1).

Acid Treatment

First, 200 g of hectorite and 1600 ml of 3 N hydrochloric acid were put into a 2-liter separable flask equipped with a condenser, and stirred in a water bath at room temperature for 20 minutes. CaCO$_3$ existing in the sample hectorite was neutralized, whereby the mixture bubbled greatly.

Next, the water bath was heated up to 95° C., and the mixture was heated therein at the elevated temperature of 95° C. for 4 hours while being stirred with an electric stirrer. The solid precipitate formed was taken out of the flask through filtration while being hot, and washed on a funnel with one liter of hot ion-exchanged water.

The resulting solid precipitate was put into a 2-liter separable flask equipped with a condenser, along with 1600 ml of 1.5 N hydrochloric acid, and heated in a water bath at 90° C. as the temperature in the water bath, for 1 hour, while being stirred with an electric stirrer. The solid precipitate thus formed was taken out of the flask through filtration, washed on a funnel with 3000 ml of hot ion-exchanged water, and then dried in vacuum to obtain 72.5 g of an acid-processed product. This product is referred to as NH-7.

Analysis of NH-7

Figure 24:
FIG. 24 is a picture taken by transmission electromicroscopic photography (×130,000), showing the structure of the silicon dioxide tetrahedron sheet of Example 7.
Figure 25:
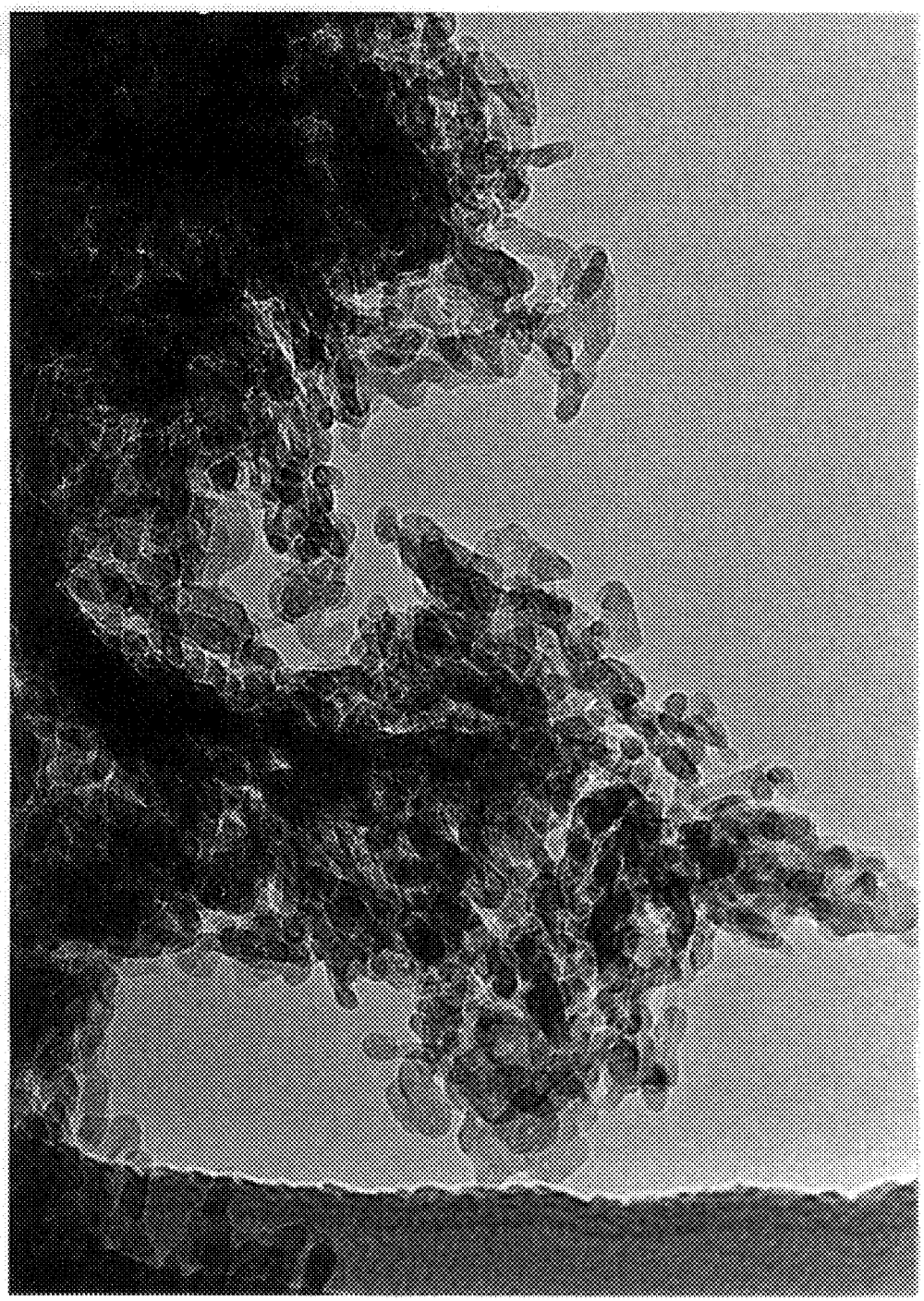
FIG. 25 is a picture taken by transmission electromicroscopic photography (×290,000), showing the structure of the silicon dioxide tetrahedron sheet of Example 7.
Figure 25:
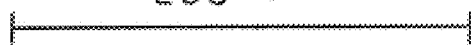

Pictures of NH-7 taken by transmission electromicroscopic photography are in FIG. 24 and FIG. 25, from which it is known that NH-7 has a structure composed of a number of fine sheets each having a size of approximately from 10 to 40 nm, that the sheets are nearly the same in size, and that NH-7 has the pseudomorphs of the silicon dioxide tetrahedron sheets intrinsic to the starting clay mineral of hectorite. As no Moire pattern based on the regularity in the layered structure was seen in those pictures, it is understood that NH-7 does not have any crystallographic regularity.

The specific surface area of NH-7 was measured in the same manner as in Example 1, to be 110 m²/g.

The starting hectorite used herein and the silicon dioxide tetrahedron sheet product obtained from it were subjected to elementary analysis, from which were obtained their atomic compositions. Table 4 shows the atomic compositions of the two, in terms of atomic percentage based on silicon atom, from which it is known that the metal atoms except silicon were removed from hectorite by the acid treatment to give high-purity silicon dioxide.

TABLE 4

| | Elementary Composition (atomic percentage based on silicon atom) | | | | |
|---|---|---|---|---|---|
| | Si | Al | Fe | Mg | Ti |
| Hectorite | 100 | 4.7 | 4.7 | 72 | 0.1 |
| NH-7 | 100 | 0.23 | 0.05 | 0.03 | 0.04 |

Processing of NH-7 with Alkylonium Hydroxide 15.0 g of a solution of 25% cetyltrimethylammonium hydroxide in methanol was put into the Teflon container of an autoclave having therein a cylindrical Teflon container, and its solvent was removed by purging with nitrogen. Then, this was dispersed in 200 ml of ion-exchanged water, to which was added 5.0 g of NH-7, sealed, and heated at 70° C. for 90 hours. After having been cooled, the solid precipitate formed was separated through filtration, washed on a funnel with 170 ml of ion-exchanged water, dried, and then calcined at 650° C. for 4 hours to obtain 4.13 g of a product.

This product is referred to as PH-7.

Analysis of PH-7

Figure 26:
FIG. 26 is a picture taken by transmission electromicroscopic photography (×24,000), showing the structure of the mesopore material of Example 7.
Figure 27:
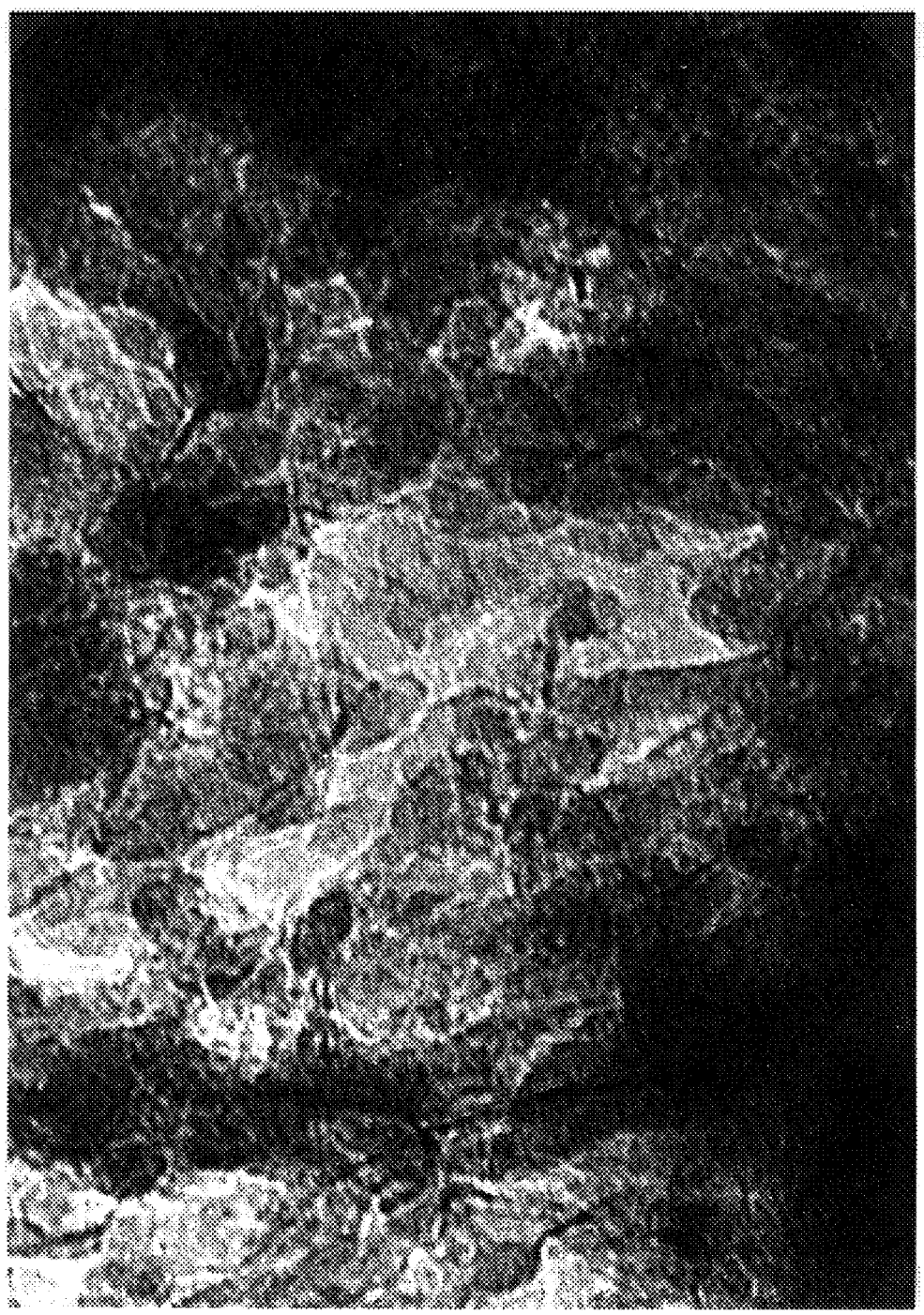
FIG. 27 is a picture taken by transmission electromicroscopic photography (×770,000), showing the structure of the mesopore material of Example 7.

Pictures of PH-7 taken by transmission electromicroscopic photography are in FIG. 26 and FIG. 27, from which it is known that PH-7 has pores as oriented in the vertical direction relative to the silicon dioxide tetrahedron sheet.

In addition, it is further known therefrom that PH-7 has a structure composed of a number of sheets each having a size of approximately from 10 to 40 nm, that the sheets are nearly the same in size, and that PH-7 has the pseudomorphs of the silicon dioxide tetrahedron sheets intrinsic to NH-7 and also to the starting hectorite.

The specific surface area of PH-7 was measured in the same manner as in Example 1, to be 500 m²/g.

Comparison Between NH-7 and PH-7

Based on their pictures taken through transmission electromicroscopic photography (TEM) and the data of specific surface area, NH-7 and PH-7 were compared with each other, which verified that PH-7 had the pseudomorphs of the silicon dioxide tetrahedron sheets intrinsic to NH-7 and to the starting clay mineral, hectorite, while its specific surface area increased to be about 4.5 times that of NH-7. This will be because PH-7 is a mesopore material having therein pores as oriented in the vertical direction relative to the silicon dioxide tetrahedron sheet, as seen in its TEM picture.

Measurement of Pore Distribution and XRD of PH-7

The pore distribution in the mesopore material PH-7 was determined in the same manner as in Example 1.

Figure 28:
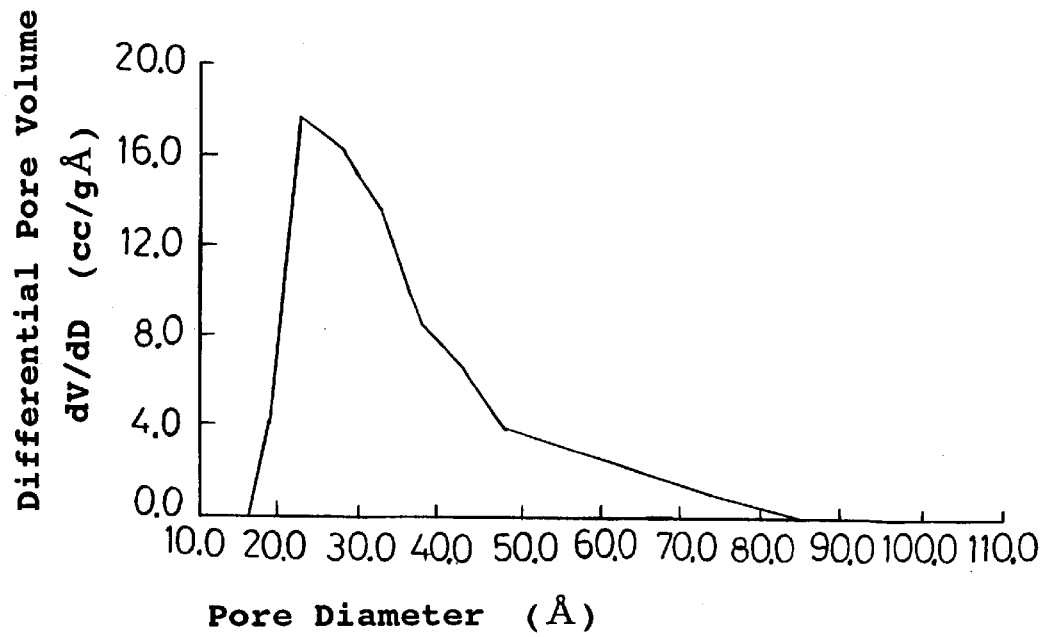
FIG. 28 is a graph of a pore distribution curve of the mesopore material of Example 7.

The pore distribution curve of PH-7 is shown in FIG. 28. The mean pore diameter of the pores existing in the sample, PH-7 was from 2.3 to 2.8 nm.

The ratio of the pore volume of the pores having a diameter in the range of −40% to +40% of the mean pore diameter to the overall pore volume in PH-7 (this ratio is referred to as "+/−40% porosity") was obtained to be 42%.

This will be because PH-7 has a structure composed of a number of small, silicon dioxide tetrahedron sheets and has many mesopores (interlayer mesopores around those sheets) having a mean pore diameter of 3 nm or larger.

From the above, it is known that PH-7 has two different types of mesopores; one being mesopores existing in small, silicon dioxide tetrahedron sheets, while being oriented in the vertical direction relative to the sheets, and having a mean pore diameter of from 2.3 to 2.8 nm, and the other being interlayer mesopores existing around those sheets and having a mean pore diameter of 3 nm or larger.

Figure 29:
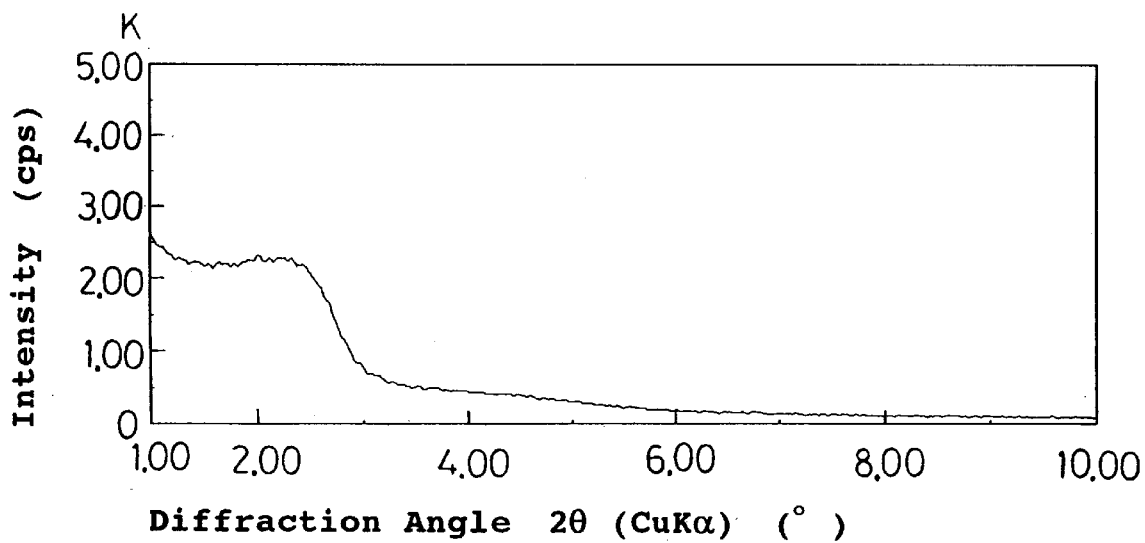
FIG. 29 is an X-ray diffraction pattern of the mesopore material of Example 7.

The mesopore material PH-7 gave the x-ray diffraction pattern as in FIG. 29, in which are seen broad peaks of the intensity at 2θ of around 2° and around 4° with the intensity decreasing in that order. This will be because, in PH-7, the mesopores that are vertical to the sheet surface and are uniform in size exist irregularly in the two-dimensional direction of the sheet.

EXAMPLE 8

Starting Clay Mineral

Kaolinite, which is a clay mineral having a 1:1 layered structure of a sheet of non-inverted silicon dioxide tetrahedrons and a sheet of octahedrons of aluminium oxide, was processed with an acid under increased pressure to give a phyllo-silicic acid with no crystallographic regularity.

Kaolinite used herein is one from Georgia.

Acid Treatment

First, 100 g of kaolinite was divided into four portions. Those four portions each weighing 25 g were separately put into the containers of autoclaves each having therein a cylindrical 300-ml Teflon container, all along with 100 ml of 50% sulfuric acid, and sealed. Next, these were heated in a drying furnace at a fixed temperature of 120° C. for 19 hours with stirring. After having been cooled, the solid precipitate formed in each container was separated through filtration, and washed on a funnel with 80 ml of 20% sulfuric acid.

The resulting solid precipitates were put into a 2-liter separable flask equipped with a condenser, along with 1200 ml of 3 N hydrochloric acid, and heated in an oil bath at 100° C. as the temperature in the oil bath, for 1 hour, while being stirred with an electric stirrer. The solid precipitate thus formed was taken out of the flask through filtration, washed on a funnel with 2 liters of 1 N hydrochloric acid and 1 liter of hot ion-exchanged water, and then freeze-dried to obtain 46.3 g of a product. This product is referred to as NK-8.

Analysis of NK-8

Figure 30:
FIG. 30 is a picture taken by transmission electromicroscopic photography (×190,000), showing the structure of the silicon dioxide tetrahedron sheet of Example 8.
Figure 31:
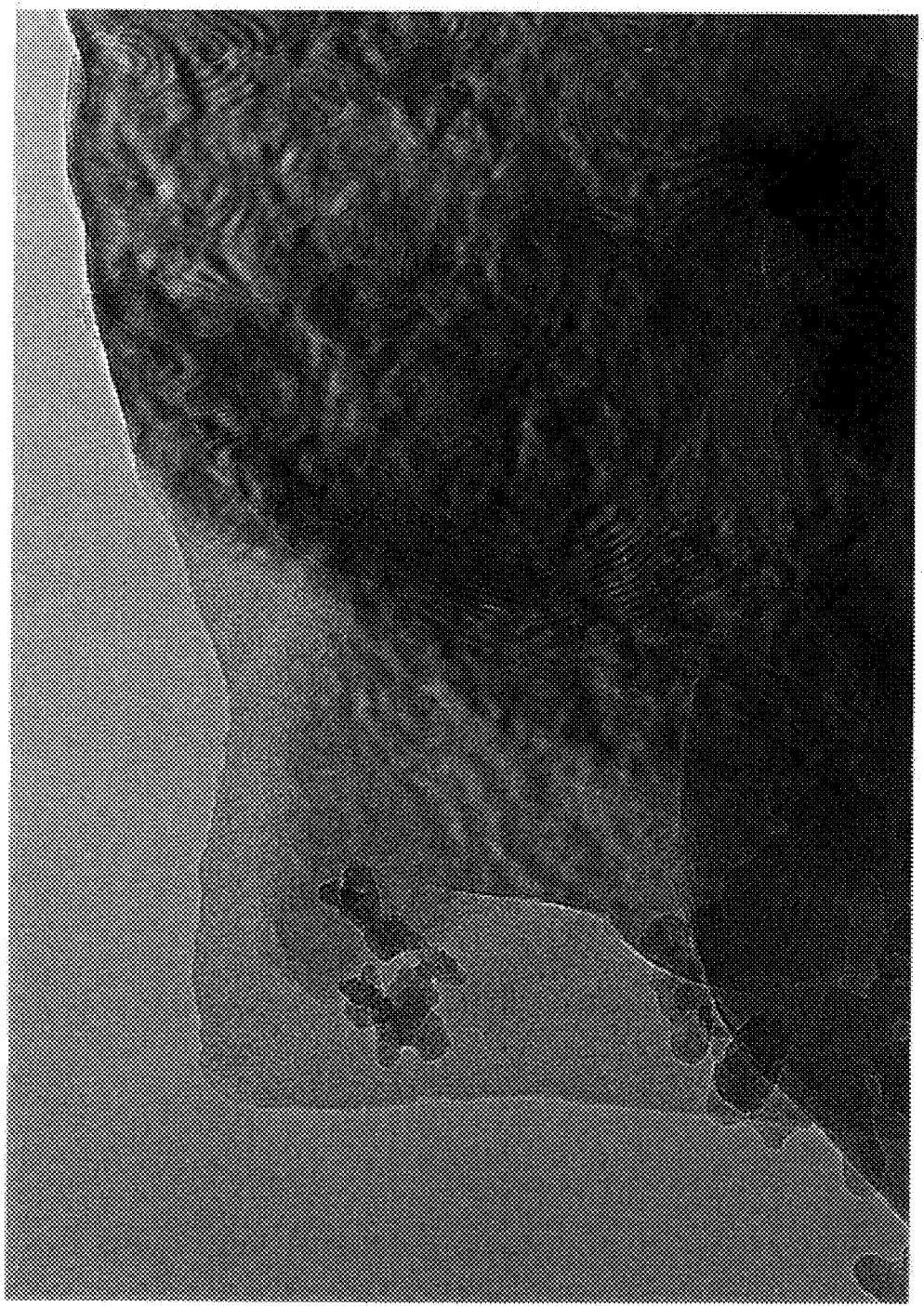
FIG. 31 is a picture taken by transmission electromicroscopic photography (×340,000), showing the structure of the silicon dioxide tetrahedron sheet of Example 8.

Pictures of NK-8 taken by transmission electromicroscopic photography are in FIG. 30 and FIG. 31, from which it is known that NK-8 has a layered structure of tabular sheets having a size of a few μm, and that NK-8 has the pseudomorphs of the silicon dioxide tetrahedron sheets intrinsic to the starting clay mineral of kaolinite. In addition to those tabular sheets, the acid treatment further gave small sheets cut in pieces to NK-8, as seen in those pictures.

The specific surface area of NK-8 was measured in the same manner as in Example 1, to be 70 m²/g.

The starting kaolinite used herein and the silicon dioxide tetrahedron sheet product, NK-8 obtained from it were subjected to elementary analysis, from which were obtained their atomic compositions. Table 5 shows the atomic compositions of the two, in terms of atomic percentage based on silicon atom, from which it is known that the metal atoms except silicon were removed from kaolinite by the acid treatment to give high-purity silicon dioxide.

TABLE 5

| | Elementary Composition (atomic percentage based on silicon atom) | | | | |
|---|---|---|---|---|---|
| | Si | Al | Fe | Mg | Ti |
| Kaolinite | 100 | 105 | 0.6 | 0.1 | 0.1 |
| NK-8 | 100 | 4.4 | 0.01 | 0.03 | 0.52 |

Processing of NK-8 with Alkylonium Hydroxide 22.5 g of a solution of 25% cetyltrimethylammonium hydroxide in methanol was put into the Teflon container of an autoclave having therein a cylindrical Teflon container, and its solvent was removed by purging with nitrogen. Then, this was dispersed in 200 ml of ion-exchanged water, to which was added 5.0 g of NK-8, sealed, and heated at 70° C. for 90 hours. After having been cooled, the solid precipitate formed was separated through filtration, washed on a funnel with 100 ml of ion-exchanged water, dried, and then calcined at 650° C. for 4 hours to obtain 4.5 g of a product.

This product is referred to as PK-8.

Analysis of PK-8

Figure 32:
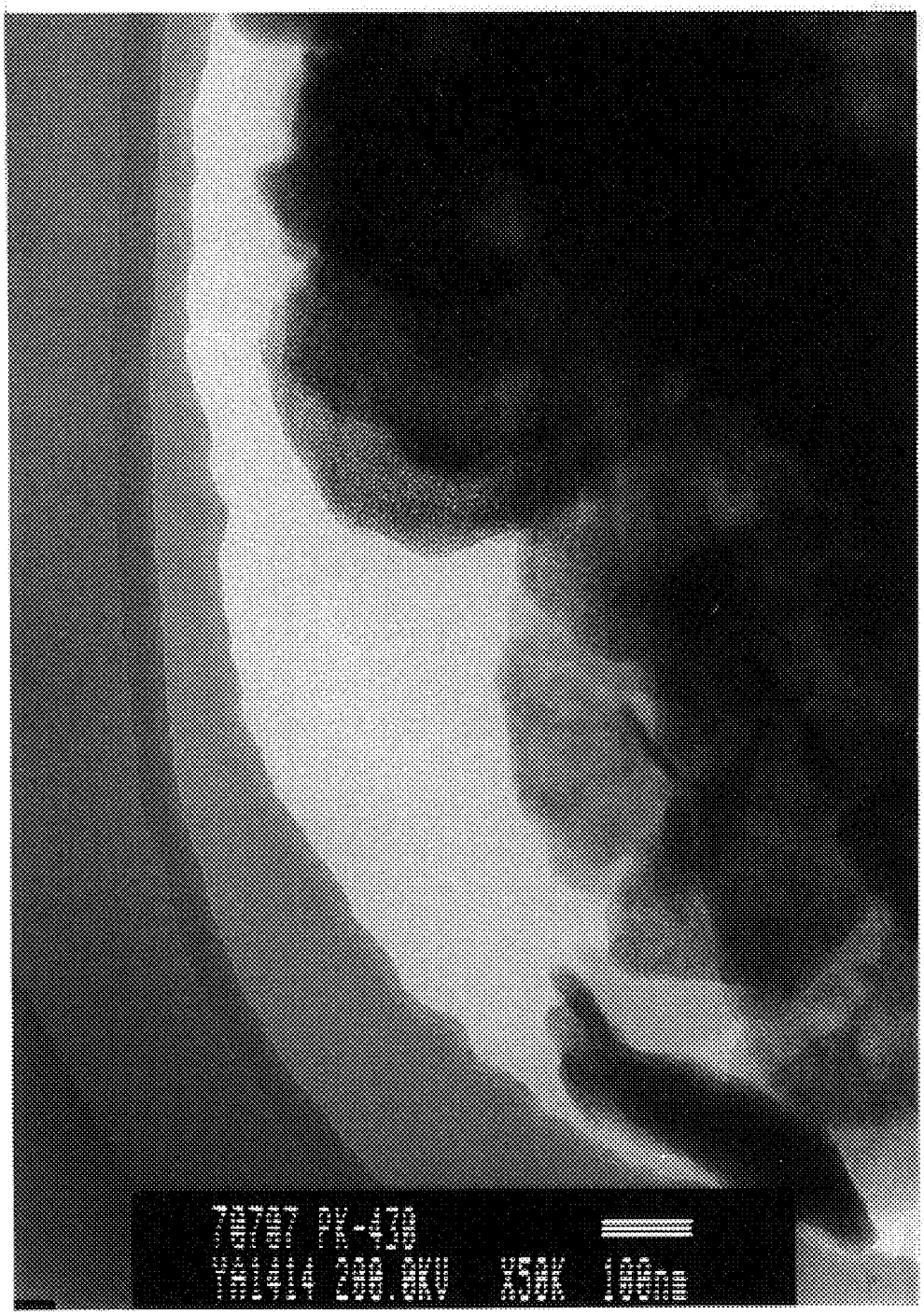
FIG. 32 is a picture taken by transmission electromicroscopic photography (×100,000), showing the structure of the mesopore material of Example 8.
Figure 33:
FIG. 33 is a picture taken by transmission electromicroscopic photography (×230,000), showing the structure of the mesopore material of Example 8.

Pictures of PK-8 taken by transmission electromicroscopic photography are in FIG. 32 and FIG. 33, from which it is known that PK-8 has pores as oriented in the vertical direction relative to the silicon dioxide tetrahedron sheet.

In addition, it is further known therefrom that PK-8 has a layered structure of tabular sheets each having a size of not smaller than about 0.5 μm, and that it has the pseudomorphs of the silicon dioxide tetrahedron sheets intrinsic to NK-8 and also to the starting kaolinite.

The specific surface area of PK-8 was measured in the same manner as in Example 1, to be 650 m$^2$/g.

Comparison Between NK-8 and PK-8

Based on their pictures taken through transmission electromicroscopic photography (TEM) and the data of specific surface area, NK-8 and PK-8 were compared with each other, which verified that PK-8 mostly had the pseudomorphs of the silicon dioxide tetrahedron sheets intrinsic to NK-8 and to the starting clay mineral, kaolinite, while its specific surface area increased to be 9 times that of NK-8. This will be because PK-8 is a mesopore material having therein pores as oriented in the vertical direction relative to the silicon dioxide tetrahedron sheet, as seen in its TEM picture.

Measurement of Pore Distribution and XRD of PK-8

The pore distribution in the mesopore material PK-8 was determined in the same manner as in Example 1.

Figure 34:
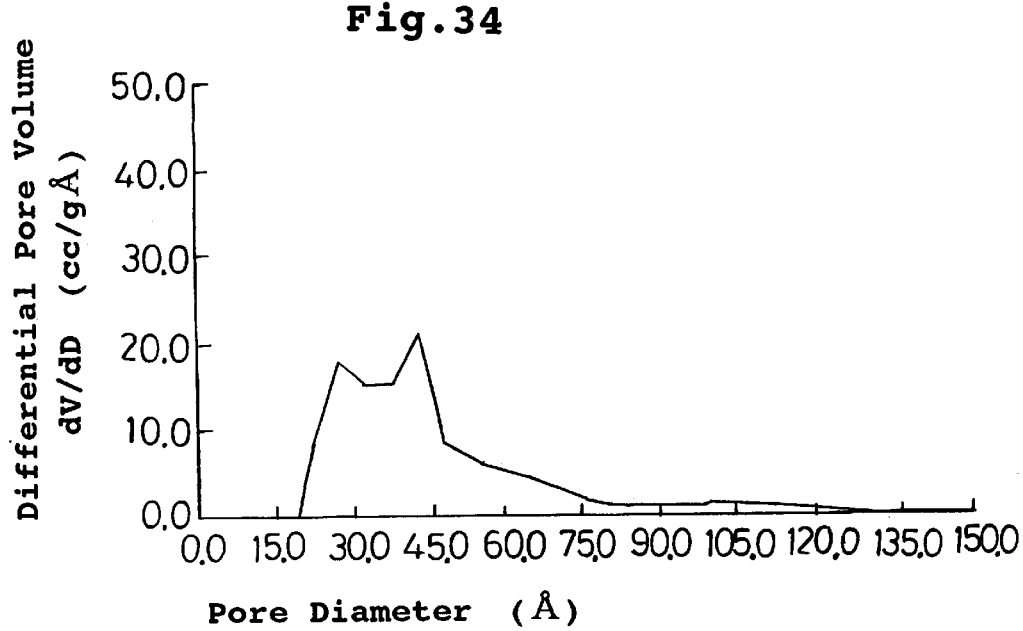
FIG. 34 is a graph of a pore distribution curve of the mesopore material of Example 8.

The pore distribution curve of PK-8 is shown in FIG. 34.

As illustrated, PK-8 was found to have two mean pore diameters of 2.7 nm and 4.3 nm.

The ratio of the pore volume of the pores having a diameter in the range of −40% to +40% of those two mean pore diameters to the overall pore volume in PK-8 (this ratio is referred to as "+/−40% porosity") was obtained to be 79%.

From the above, it is known that PK-8 has mesopores at least having a mean pore diameter of 2.7 nm and oriented in the vertical direction relative to the silicon dioxide tetrahedron sheet. However, it is unclear as to whether or not the pores in PK-8 having a mean pore diameter of 4.3 nm might be based on the structure of the small, silicon dioxide tetrahedron sheets as cut in pieces.

Figure 35:
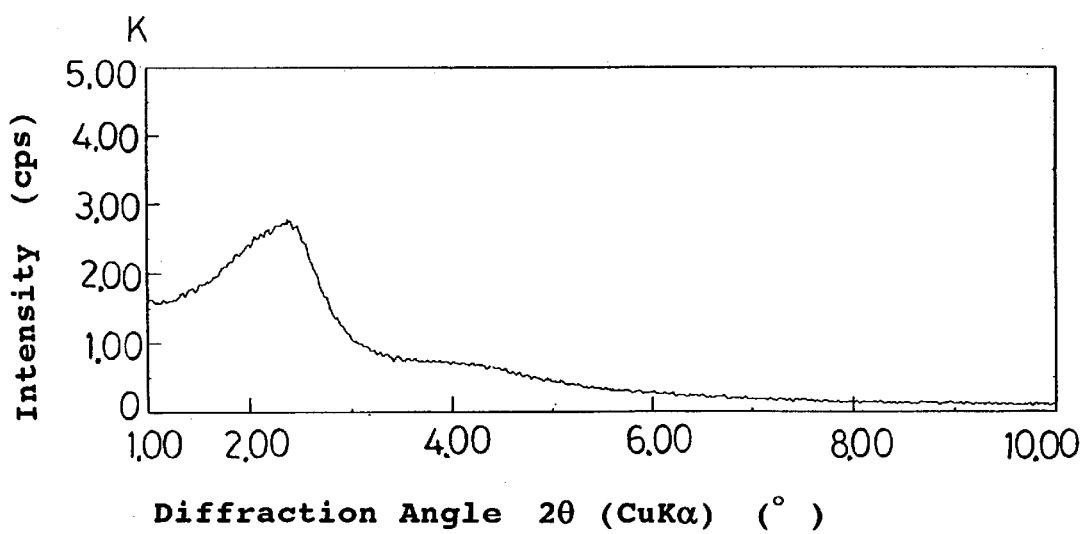
FIG. 35 is an X-ray diffraction pattern of the mesopore material of Example 8.

The mesopore material PK-8 gave the X-ray diffraction pattern as in FIG. 35.

As illustrated, seen are broad peaks of the intensity at 2θ of around 2° and around 4° with the intensity decreasing in that order. This will be because, in PK-8, the mesopores that are vertical to the sheet surface and are uniform in size exist irregularly in the two-dimensional direction of the sheet.

EXAMPLE 9

Starting Clay Mineral

Kanemite, which is a clay mineral having a layered structure of sheets of inverted silicon dioxide tetrahedrons, was subjected to ion exchange to prepare a kanemite-derived phyllo-silicic acid.

Kanemite used herein was prepared as follows: 150 g of disodium silicate (δ-Na$_2$Si$_2$O$_5$), which had been obtained by calcining water glass No. 1 at 700° C. for 6 hours, and 1500 ml of hot water were stirred in a 2-liter plastic vat at 70° C. for 40 minutes, and the resulting dispersion was filtered to separate the solid precipitate of kanemite.

Acid Treatment

First, the thus-filtered kanemite was dispersed in 1500 ml of hot water in a 2-liter plastic vat, to which was added 190 ml of 2 N hydrochloric acid to neutralize it. Thus, the dispersion had a pH of 6.6 at 29° C. The solid precipitate formed was separated through filtration, washed on a funnel with about 6 liters of hot water, and then freeze-dried to obtain 17.5 g of kanemite-derived phyllo-silicic acid.

This product is referred to as NKn-9.

Analysis of NKn-9

The specific surface area of NKn-9 was measured in the same manner as in Example 1, to be 430 m$^2$/g.

Processing of NKn-9 with Alkylonium Hydroxide 30.2 g of a solution of 25% cetyltrimethylammonium hydroxide in methanol was put into the Teflon container of an autoclave having therein a cylindrical Teflon container, and its solvent was removed by purging with nitrogen. Then, this was dispersed in 200 ml of ion-exchanged water, to which was added 5.0 g of NKn-9, sealed, and heated at 70° C. for 5 hours. After having been cooled, the solid precipitate formed was separated through filtration, washed on a funnel with 2 liters of ion-exchanged water, dried, and then calcined at 650° C. for 4 hours to obtain 3.7 g of a product.

This product is referred to as PKn-9.

Analysis of PKn-9

Figure 36:
FIG. 36 is a picture taken by transmission electromicroscopic photography (×300,000), showing the structure of the mesopore material of Example 9.
Figure 37:
FIG. 37 is a picture taken by transmission electromicroscopic photography (×750,000), showing the structure of the mesopore material of Example 9.
Figure 37:
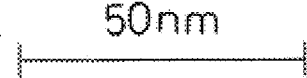

Pictures of PKn-9 taken by transmission electromicroscopic photography are in FIG. 36 and FIG. 37, from which it is known that PKn-9 has pores as oriented in the vertical direction relative to the silicon dioxide tetrahedron sheet.

In addition, it is further known therefrom that PKn-9 has a structure of sheets differing in size and having rough surfaces. This structure of PKn-9 will be derived from the structure of silicon dioxide tetrahedron sheets of NKn-9 and that of the starting clay mineral, kanemite.

The specific surface area of PKn-9 was measured in the same manner as in Example 1, to be 690 m$^2$/g.

Comparison Between NKn-9 and PKn-9

Comparing their data of specific surface area, it is known that the specific surface area of PKn-9 increased to be 1.6 times that of NKn-9. This will be because PKn-9 is a mesopore material having therein pores as oriented in the vertical direction relative to the silicon dioxide tetrahedron sheet, as seen in its TEM picture. In addition, from its TEM picture, it is presumed that PKn-9 has the pseudomorphs of the silicon dioxide tetrahedron sheets intrinsic to NKn-9 and to the starting clay mineral, kanemite.

Measurement of Pore Distribution and XRD of PKn-9

The pore distribution in the mesopore material PKn-9 was determined in the same manner as in Example 1.

Figure 38:
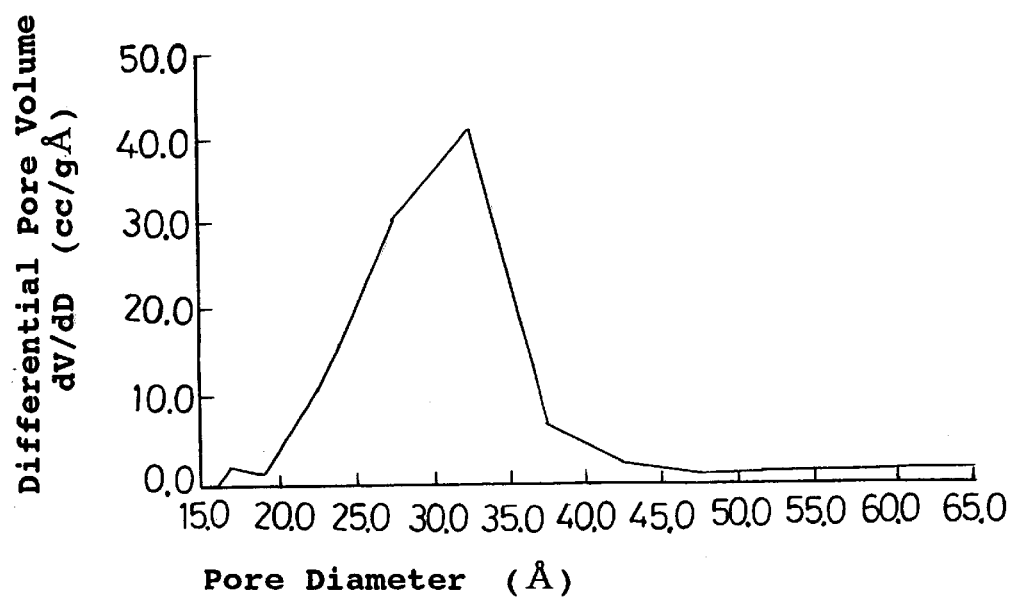
FIG. 38 is a graph of a pore distribution curve of the mesopore material of Example 9.

The pore distribution curve of PKn-9 is shown in FIG. 38.

As illustrated, PKn-9 was found to have a mean pore diameter of 3.3 nm.

The ratio of the pore volume of the pores having a diameter in the range of −40% to +40% of the mean pore diameter to the overall pore volume in PKn-9 (this ratio is referred to as "+/−40% porosity") was obtained to be 78%. This indicates high uniformity of the pore size in PKn-9.

From the above, it is known that PKn-9 has mesopores having a mean pore diameter of 3.3 nm and oriented in the vertical direction relative to the silicon dioxide tetrahedron sheet, and that the mesopores in PKn-9 are nearly the same in size.

Figure 39:
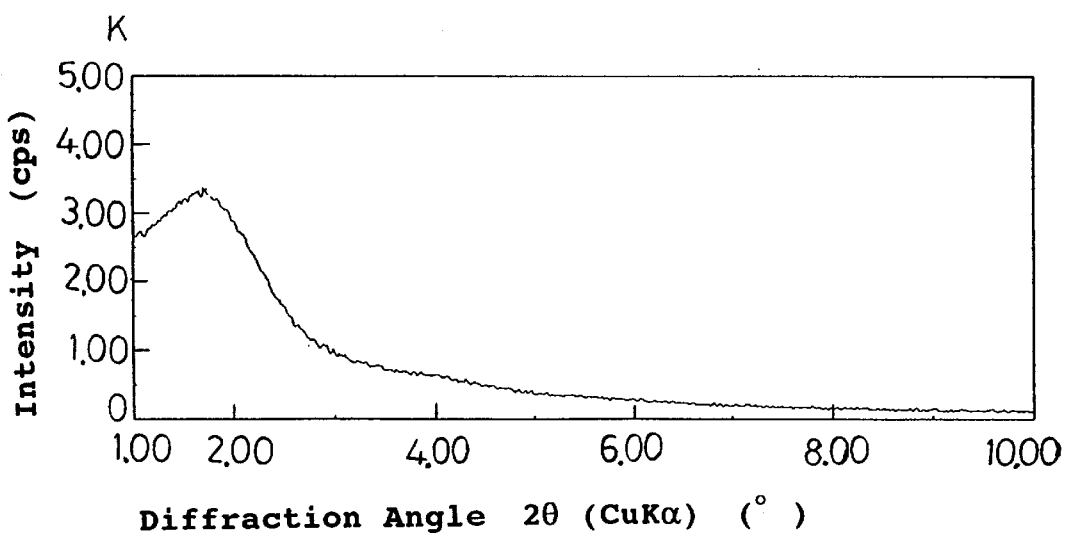
FIG. 39 is an X-ray diffraction pattern of the mesopore material of Example 9.

The mesopore material PKn-9 gave the X-ray diffraction pattern as in FIG. 39.

As illustrated, seen are broad peaks of the intensity at 2θ of around 2° and around 4° with the intensity decreasing in that order. This will be because, in PKn-9, the mesopores that are vertical to the sheet surface and are uniform in size exist irregularly in the two-dimensional direction of the sheet.

EXAMPLE 10
Processing of NC-3 in Example 3 with Alkylonium Hydroxide 30.2 g of a solution of 25% cetyltrimethylammonium hydroxide in methanol was put into the Teflon container of an autoclave having therein a cylindrical Teflon container, and its solvent was removed by purging with nitrogen. Then, this was dispersed in 200 ml of ion-exchanged water, to which was added 5.0 g of NC-3, sealed, and heated at 70° C. for 5 hours. After having been cooled, the solid precipitate formed was separated through filtration, washed on a funnel with 2 liters of ion-exchanged water and 200 ml of ethanol, dried, and then calcined at 650° C. for 4 hours to obtain 3.52 g of a product.

This product is referred to as PC-10.

Analysis of PC-10

Figure 40:
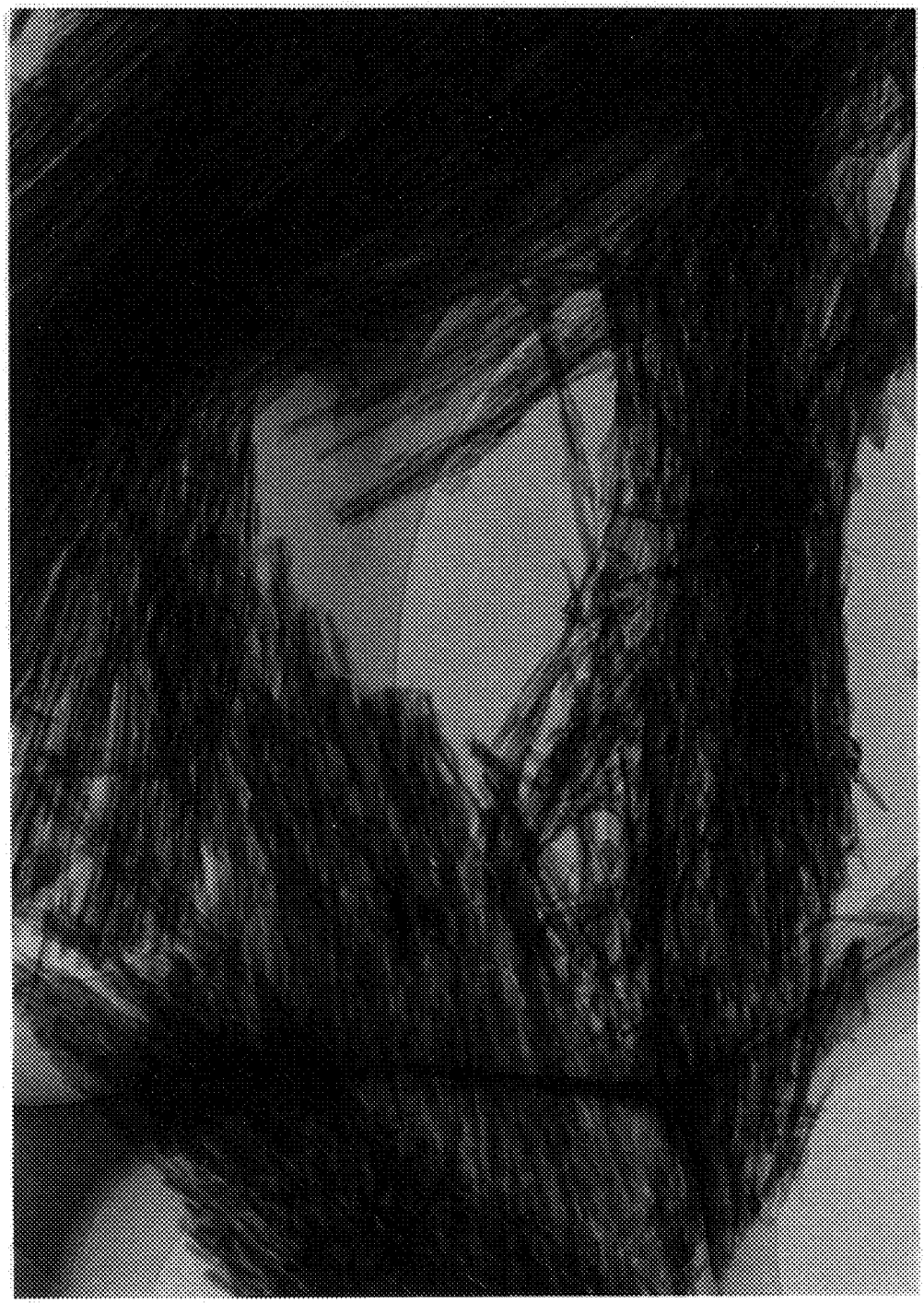
FIG. 40 is a picture taken by transmission electromicroscopic photography (×30,000), showing the structure of the mesopore material of Example 10.
Figure 41:
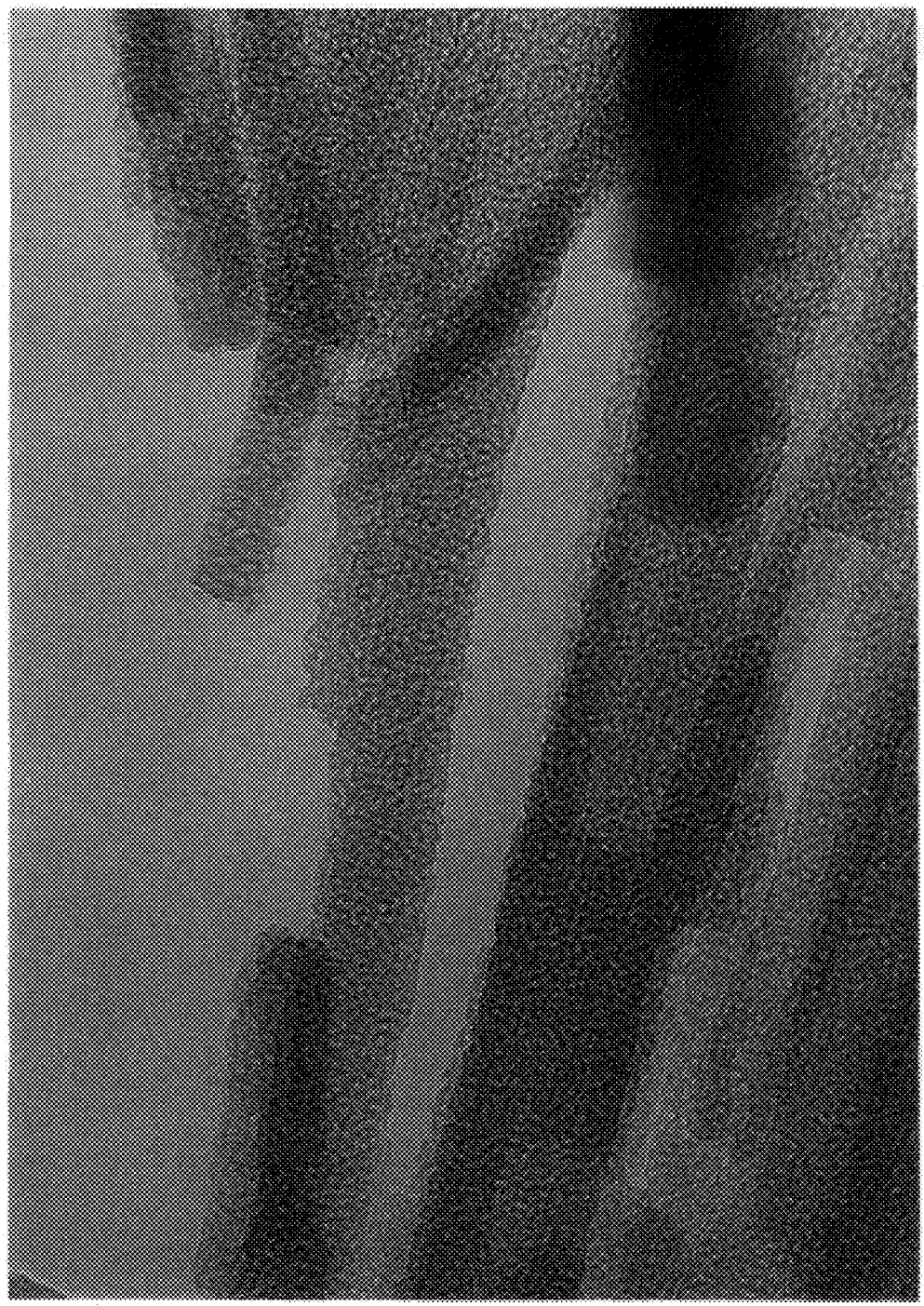
FIG. 41 is a picture taken by transmission electromicroscopic photography (×410,000), showing the structure of the mesopore material of Example 10.

Pictures of PC-10 taken by transmission electromicroscopic photography are in FIG. 40 and FIG. 41, from which it is known that PC-10 has pores as oriented in the vertical direction relative to the silicon dioxide tetrahedron sheet.

In addition, it is further known therefrom that PC-10 has a columnar or tubular layered structure having a diameter of about 30 nm and a length of approximately from 20 to 30 μm or smaller, that the columnar or tubular structure made by winding tabular sheets are nearly the same in diameter, and that PC-10 has the pseudomorphs of the silicon dioxide tetrahedron sheets intrinsic to NC-3 and also to the starting crysotile.

The specific surface area of PC-10 was measured in the same manner as in Example 1, to be 530 m²/g.

Comparison Between NC-3 and PC10

Based on their pictures taken through transmission electromicroscopic photography and the data of specific surface area, NC-3 and PC-10 were compared with each other, which verified that PC-10 had the pseudomorphs of the silicon dioxide tetrahedron sheets intrinsic to NC-3 and to the starting clay mineral, while its specific surface area increased to be about 3 times that of NC-3. This will be because PC-10 is a mesopore material having therein pores as oriented in the vertical direction relative to the silicon dioxide tetrahedron sheet, as seen in its TEM picture.

Measurement of Pore Distribution and XRD of PC-10

The pore distribution in the mesopore material PC-10 was determined in the same manner as in Example 1.

Figure 42:
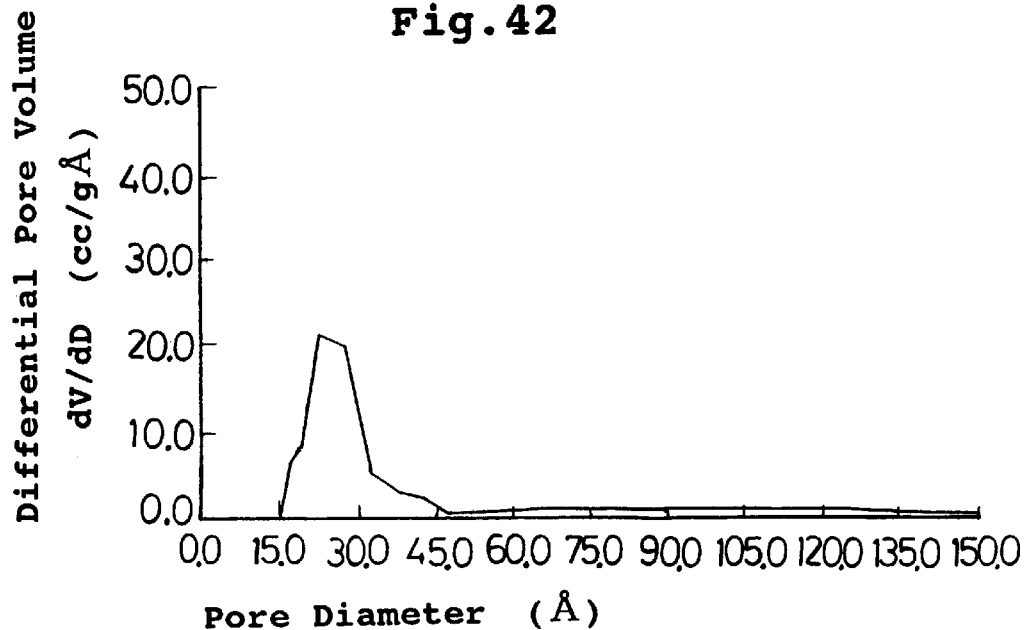
FIG. 42 is a graph of a pore distribution curve of the mesopore material of Example 10.

The pore distribution curve of PC-10 is shown in FIG. 42.

As illustrated, PC-10 was found to have a mean pore diameter of from 2.3 to 2.8 nm.

The ratio of the pore volume of the pores having a diameter in the range of −40% to +40% of the mean pore diameter to the overall pore volume in PC-10 (this ratio is referred to as "+/−40% porosity") was obtained to be 61% This indicates higher uniformity of the pore size in PC-10 than that in Example 3.

This will be because, in this Example 10, the amount of the cetyltrimethylammonium compound used for processing NC-3 was increased to be 4 times that in Example 3.

From the above, it is known that PC-10 has two different types of mesopores; one being mesopores having a mean pore diameter of from 2.3 to 2.8 nm and oriented in the vertical direction relative to the silicon dioxide tetrahedron sheet, and the other being mesopores having a mean pore diameter of 3 nm or larger and based on the tubular structure of PC-10.

Figure 43:
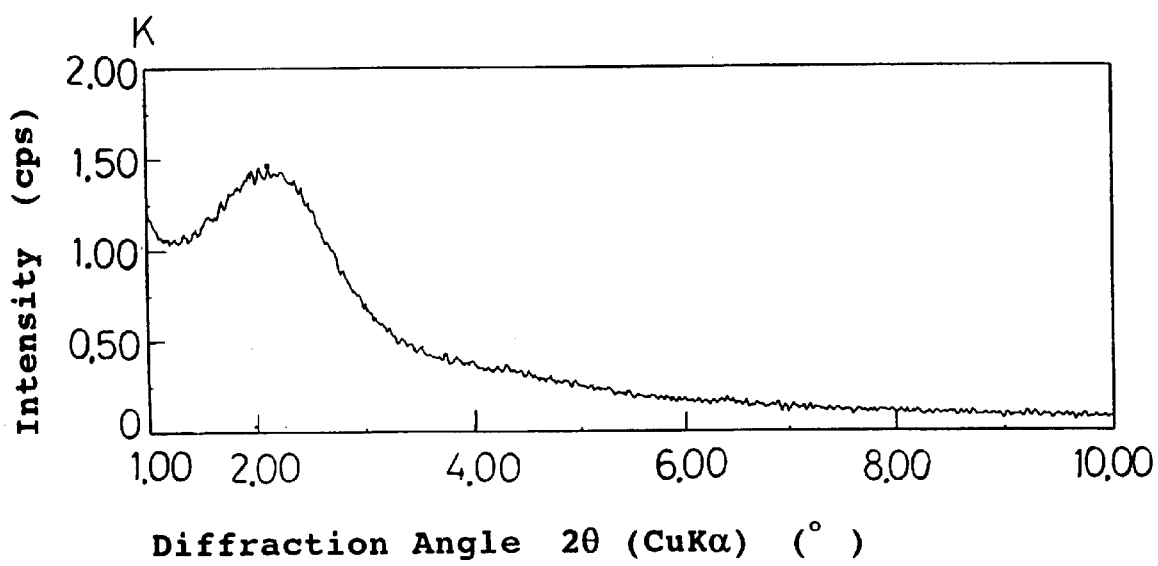
FIG. 43 is an X-ray diffraction pattern of the mesopore material of Example 10.

The mesopore material PC-10 gave the X-ray diffraction pattern as in FIG. 43, in which are seen broad peaks of the intensity at 2θ of around 2' and around 4° with the intensity decreasing in that order. This will be because, in PC-10, the mesopores that are vertical to the sheet surface and are uniform in size exist irregularly in the two-dimensional direction of the sheet.

While the invention has been described in detail and with reference to specific embodiments thereof, it will be apparent to one skilled in the art that various changes and modifications can be made therein without departing from the spirit and scope thereof.

We claim:

1. A mesopore material comprising:
   a silicon dioxide tetrahedron sheet having phyllo-structured 6-membered skeletons connected to each other, each phyllo-structured 6-membered skeleton being formed by connecting 6 silicon dioxide tetrahedrons together, and the sheet having pores therein formed by removing a number of the silicon dioxide tetrahedrons from the sheet.

2. The mesopore material as claimed in claim 1, wherein said silicon dioxide tetrahedron sheet has the morphology of the starting raw material of clay minerals for the sheet.

3. The mesopore material as claimed in claim 2, wherein said morphology is in any of tabular, tubular or fibrous forms.

4. The mesopore material as claimed in claim 1, wherein said silicon dioxide tetrahedron sheet has phyllo-structured 6-membered skeletons as artificially synthesized or as obtained by processing natural phyllo-silicates.

5. The mesopore material as claimed in claim 1, wherein said pores have a diameter of not smaller than about 1.0 nm.

6. The mesopore material as claimed in claim 5, wherein said pores are nearly uniform in diameter.

7. The mesopore material as claimed in claim 6, wherein said pores have a uniform diameter of about 3 nm.

8. The mesopore material as claimed in claim 1, wherein said pores have a mean pore diameter ranging from 1 to 10 nm in a pore distribution curve, and the pores with a diameter in a range of −40% to +40% of the mean pore diameter have a pore volume of 40% or more of a total pore volume of the mesopore material.

9. The mesopore material as claimed in claim 8, wherein the pores with a diameter in a range of −40% to +40% of the mean pore diameter have a pore volume of 60% or more of a total pore volume of the mesopore material.

10. A method for producing a mesopore material of a silicon dioxide tetrahedron sheet, comprising a step of:
    reacting a silicon dioxide tetrahedron sheet with an alkylonium salt, the sheet being formed by connecting phyllo-structured 6-membered skeletons to each other, each phyllo-structured 6-membered skeleton being formed by connecting 6 silicon dioxide tetrahedrons together, thereby removing a number of the silicon dioxide tetrahedrons to form pores in the sheet.

11. The method for producing a mesopore material as claimed in claim 10, wherein said silicon dioxide tetrahedron sheet is prepared by dissolving the metal oxide octahedron layers from a synthetic or natural phyllo-silicate, or is a silicon dioxide tetrahedron sheet having the morphology of a starting raw material of clay minerals for the sheet.

12. The method for producing a mesopore material as claimed in claim 11, wherein said dissolving is conducted with an acid.

13. The method for producing a mesopore material as claimed in claim 11, wherein said synthetic or natural phyllo-silicate is at least one selected from the group consisting of sepiolite, vermiculite, kanemite, crysotile, disodium silicate crystals, ilerite, magadiite, and kenyaite.

14. The method for producing a mesopore material as claimed in claim 10, wherein the counter anion moiety of said alkylonium salt is a conjugate base of a weak acid, or an anion of a fluoride compound.

15. The method for producing a mesopore material as claimed in claim 14, wherein said alkylonium salt is an alkylonium hydroxide.

16. The method for producing a mesopore material as claimed in claim 10, wherein the alkylonium moiety of said alkylonium salt is any of alkylammoniums, alkylsulfoniums and alkylphosphoniums.

17. The method for producing a mesopore material as claimed in claim 10, wherein the alkyl moieties of said alkylonium salt are a combination of linear or branched short alkyl groups each having 4 or less carbon atoms, and linear or branched long alkyl groups each having 5 or more carbon atoms.

* * * * *